US011619283B2

(12) United States Patent
Yoshikawa et al.

(10) Patent No.: US 11,619,283 B2
(45) Date of Patent: Apr. 4, 2023

(54) DAMPER DEVICE

(71) Applicants: AISIN CORPORATION, Kariya (JP); AISIN AW INDUSTRIES CO., LTD., Echizen (JP)

(72) Inventors: Takuya Yoshikawa, Fukui (JP); Tomonori Kinoshita, Sabae (JP); Tetsuro Taniguchi, Fukui (JP); Akiyoshi Kato, Echizen (JP); Yoichi Oi, Ama (JP)

(73) Assignees: AISIN CORPORATION, Kariya (JP); AISIN AW INDUSTRIES CO., LTD., Echizen (JP)

( * ) Notice: Subject to any disclaimer, the term of this patent is extended or adjusted under 35 U.S.C. 154(b) by 618 days.

(21) Appl. No.: 16/644,538

(22) PCT Filed: Nov. 14, 2018

(86) PCT No.: PCT/JP2018/042194
§ 371 (c)(1),
(2) Date: Mar. 5, 2020

(87) PCT Pub. No.: WO2019/098252
PCT Pub. Date: May 23, 2019

(65) Prior Publication Data
US 2020/0263760 A1    Aug. 20, 2020

(30) Foreign Application Priority Data
Nov. 14, 2017   (JP) .............................. JP2017-219521

(51) Int. Cl.
*F16F 15/134*   (2006.01)
*F16D 3/12*     (2006.01)
(Continued)

(52) U.S. Cl.
CPC .......... *F16F 15/13469* (2013.01); *F16D 3/12* (2013.01); *F16F 15/1478* (2013.01);
(Continued)

(58) Field of Classification Search
CPC ............. F16F 15/13469; F16F 15/1478; F16F 15/13484; F16H 45/02; F16H 2045/0268; F16H 2045/0226; F16D 3/12
See application file for complete search history.

(56) References Cited

U.S. PATENT DOCUMENTS 6,126,568 A     10/2000  Sudau
2017/0261065 A1  9/2017  Yoshikawa et al.
(Continued)

FOREIGN PATENT DOCUMENTS

DE    197 36 843 A1    3/1999
WO    2016/104783 A1   6/2016
(Continued)

OTHER PUBLICATIONS

International Search Report of PCT/JP2018/042194 dated Jan. 22, 2019 [PCT/ISA/210].

*Primary Examiner* — Vishal R Sahni
(74) *Attorney, Agent, or Firm* — Sughrue Mion, PLLC

(57) ABSTRACT

A damper device including an input element and an output element; an elastic body transmitting torque between the input element and the output element; and a rotary inertia mass damper having a mass body. The rotary inertia mass damper includes a sun gear, a carrier rotatably supporting pinion gears, and a ring gear that meshes with the pinion gears and serving as the mass body. A pair of washers is located on both sides of each pinion gear axially. The ring gear includes an annulus gear having internal teeth meshing with the pinion gears and a weight body fixed to the annulus gear such that the weight body is in contact with a side
(Continued)

surface of the annulus gear. An inner circumferential surface of the weight body is supported in a radial direction by a tip of the pinion gear or an outer circumferential surface of the washer.

14 Claims, 11 Drawing Sheets

(51) Int. Cl.
    *F16F 15/14*     (2006.01)
    *F16H 45/02*     (2006.01)

(52) U.S. Cl.
    CPC ..... *F16H 45/02* (2013.01); *F16H 2045/0226* (2013.01); *F16H 2045/0268* (2013.01)

(56) References Cited

U.S. PATENT DOCUMENTS

| | | |
|---|---|---|
| 2018/0245663 A1 | 8/2018 | Yoshikawa et al. |
| 2019/0195313 A1 | 6/2019 | Yoshikawa et al. |
| 2019/0301562 A1 | 10/2019 | Yoshikawa et al. |

FOREIGN PATENT DOCUMENTS

| | | |
|---|---|---|
| WO | 2016/208767 A1 | 12/2016 |
| WO | 2017131229 A1 | 8/2017 |

DAMPER DEVICE

CROSS REFERENCE TO RELATED APPLICATIONS

This application is a National Stage of International Application No. PCT/JP2018/042194, filed Nov. 14, 2018, claiming priority to Japanese Patent Application No. 2017-219521, filed Nov. 14, 2017, the contents of which are incorporated in their entirety.

TECHNICAL FIELD

The present disclosure relates to a damper device including an elastic body that transmits torque between an input element and an output element, and a rotary inertia mass damper.

BACKGROUND ART

Hitherto, as a rotary inertia mass damper of a damper device of this type, a rotary inertia mass damper having a planetary gear including a sun gear that rotates as a unit with an output element, a carrier that supports a plurality of pinion gears so that the pinion gears are rotatable and that rotates as a unit with an input element, and a ring gear that meshes with the pinion gears and that functions as a mass body is known (for example, see Patent Document 1). The pinion gear of the rotary inertia mass damper includes an annular gear body having outer teeth on an outer periphery, a plurality of needle bearings disposed between an inner periphery of the gear body and an outer periphery of a pinion shaft, and a pair of spacers that are fitted to both end portions of the gear body and that restrict the needle bearings from moving in an axial direction. The gear body of the pinion gear includes an annular radial direction supporting portion that has an outer peripheral surface that is a cylindrical surface and that protrudes from both sides of the outer teeth in the axial direction on the inner peripheral side of the pinion gear in the radial direction relative to a tooth bottom of each outer tooth. The ring gear serving as the mass body includes an annular gear body having inner teeth formed on an inner periphery, two side plates each formed in an annular shape and having a recessed cylindrical surface, and a plurality of rivets for fixing the side plates to both sides of the gear body in the axial direction. When the outer teeth of the pinion gears and the inner teeth of the ring gear mesh with each other, the inner circumferential surface of the side plates of the ring gear is supported in the radial direction by the corresponding radial direction supporting portion of the gear body of the pinion gear.

RELATED ART DOCUMENTS

Patent Documents

Patent Document 1: WO 2016/208767

SUMMARY OF THE DISCLOSURE

With the conventional damper device described above, it is possible to accurately align the ring gear with respect to a shaft center of the output element with the radial direction supporting portion of the pinion gears so that the ring gear rotates (pivots) smoothly. Thus, a vibration damping effect of the rotary inertia mass damper can be further improved. However, with the damper device described above, there is a possibility that costs will be increased due to an increase in the number of assembly parts of the pinion gear and an increase in the number of steps of the manufacturing and assembly processes.

It is thus an aspect of the present disclosure further to improve the vibration damping effect of the rotary inertia mass damper while suppressing an increase in the number of assembly parts of a damper device and suppressing an increase in cost.

A damper device according to the present disclosure is a damper device including the following: a plurality of rotating elements including an input element to which torque from an engine is transmitted, and an output element; an elastic body that transmits torque between the input element and the output element; and a rotary inertia mass damper having a mass body that rotates in accordance with relative rotation between a first rotating element that is any of the plurality of rotating elements and a second rotating element that is different from the first rotating element. The rotary inertia mass damper has a planetary gear that includes the following: a sun gear that rotates as a unit with the first rotating element; a carrier that rotatably supports a plurality of pinion gears and that rotates as a unit with the second rotating element; and a ring gear that meshes with the plurality of pinion gears and that serves as the mass body. On both sides each of the pinion gears in the axial direction, at least one pair of washers is located. The ring gear includes the following: an annulus gear having a plurality of internal teeth that mesh with the plurality of pinion gears; and a weight body that is fixed to the annulus gear such that the weight body is in contact with a side surface of the annulus gear. An inner circumferential surface of the weight body is supported in a radial direction by a tip of the pinion gear or an outer circumferential surface of the washer.

In the above damper device, the ring gear of the rotary inertia mass damper includes the following: the annulus gear having the internal teeth that mesh with the pinion gears; and a weight body that is fixed to the annulus gear such that the weight body is in contact with one side surface of the annulus gear. The inner circumferential surface of the weight body is supported in the radial direction by the tip of the pinion gear or the outer circumferential surface of the washer located on a side of the pinion gear. In this way, an external gear having a simple structure can be adopted as the pinion gear and it is possible to suppress an increase in cost that results from an increase in the number of assembly parts of the pinion gear and from an increase in the number of steps of the manufacturing and assembly process. Since the inner circumferential surface of the weight body of the ring gear is supported in the radial direction by the tip of the pinion gear or the outer circumferential surface of the washer, the ring gear can be accurately aligned with the axis of the carrier and the sun gear so that the ring gear can rotate (pivot) smoothly. Thus, a vibration damping effect of the rotary inertia mass damper can be further improved. In the damper device, it is also possible to adjust the weight of the weight body to appropriately set the moment of inertia of the ring gear so as to further improve the vibration damping effect of the rotary inertia mass damper. As a result, it is possible to further improve the vibration damping effect of the rotary inertia mass damper while suppressing an increase in the number of assembly parts of the damper device and an increase in cost.

DETAILED DESCRIPTION

Next, an embodiment of the present disclosure is described with reference to the drawings.

Figure 1:
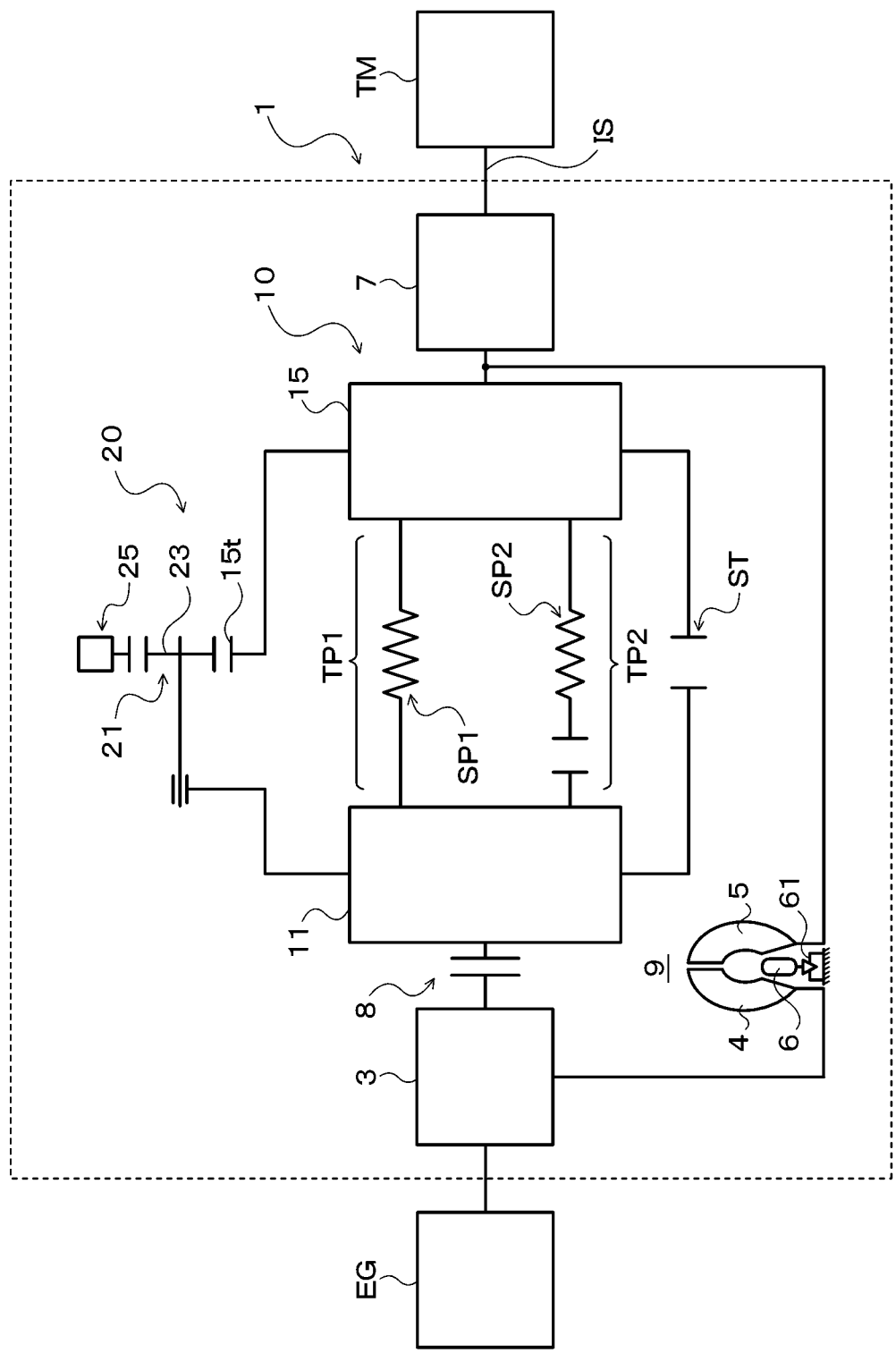
FIG. 1 is a schematic diagram of a starting apparatus including a damper device according to the present disclosure.
Figure 2:
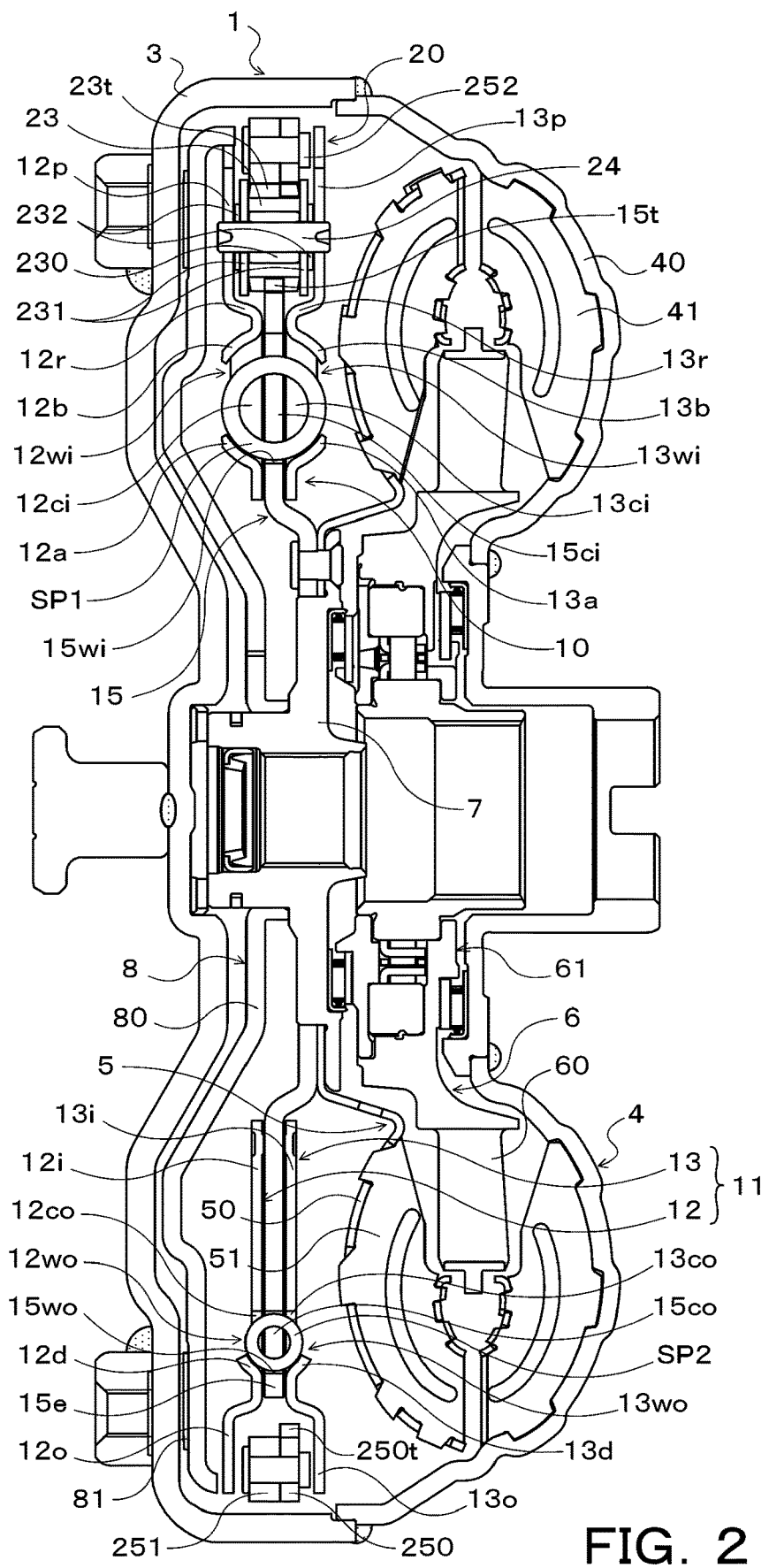
FIG. 2 is a cross-sectional view of the damper device according to the present disclosure.

FIG. 1 is a schematic diagram of a starting apparatus 1 including a damper device 10 according to the present disclosure, and FIG. 2 is a cross-sectional view of the starting apparatus 1. The starting apparatus 1 illustrated in these drawings is adapted to be mounted on a vehicle having an engine (an internal combustion engine) EG as a drive unit. In addition to the damper device 10, the starting apparatus 1 includes the following: a front cover 3 as an input member coupled to a crankshaft of the engine EG to receive torque transmitted from the engine EG; a pump impeller (an input-side fluid transmission element) 4 fixed to the front cover 3; a turbine runner (an output-side fluid transmission element) 5 rotatable coaxially with the pump impeller 4; a damper hub 7 as an output member coupled to the damper device 10 and fixed to an input shaft IS of a transmission TM that is an automatic transmission (AT) or a continuously variable transmission (CVT); and a lockup clutch 8.

In the description below, unless specified otherwise, the term "axial direction" basically refers to the direction of extension of a central axis (an axis) of the starting apparatus 1 and the damper device 10. Further, unless specified otherwise, the term "radial direction" basically refers to the radial direction of the starting apparatus 1, the damper device 10, and rotating elements of the damper device 10 and the like, i.e., refers to the direction of extension of a straight line that extends from the central axis of the starting apparatus 1 and the damper device 10 in directions (radial directions) orthogonal to the center axis. Furthermore, unless specified otherwise, the term "circumferential direction" basically refers to the circumferential direction of the starting apparatus 1, the damper device 10, and rotating elements of the damper device 10 and the like, i.e., refers to directions along the direction of rotation of the rotating elements.

The pump impeller 4 includes a pump shell 40 that is tightly fixed to the front cover 3, and multiple pump blades 41 that are disposed on the inner surface of the pump shell 40. The turbine runner 5 includes a turbine shell 50 and multiple turbine blades 51 that are disposed on the inner surface of the turbine shell 50. An inner perimeter portion of the turbine shell 50 is fixed to the damper hub 7 via multiple rivets. The pump impeller 4 and the turbine runner 5 face each other, and a stator 6 is coaxially located therebetween so as to rectify the flow of hydraulic oil (hydraulic fluid) from the turbine runner 5 to the pump impeller 4. The stator 6 has multiple stator blades 60, and the direction of rotation of the stator 6 is set to only one direction by a one-way clutch 61 (refer to FIG. 1). The pump impeller 4, the turbine runner 5, and the stator 6 form a torus (an annular flow passage) for circulating the hydraulic oil and serve as a torque converter (a fluid transmission device) with the function of amplifying torque. Alternatively, in the starting apparatus 1, the stator 6 and a one-way clutch 60 may be omitted, and the pump impeller 4 and the turbine runner 5 may be caused to serve as a fluid coupling.

The lockup clutch 8 performs lockup that couples together the front cover 3 and the damper hub 7 via the damper device 10, and also releases the lockup. According to the present embodiment, the lockup clutch 8 is a hydraulic, single-plate clutch that includes a lockup piston 80 with a friction material 81 bonded thereto. The lockup piston 80 of the lockup clutch 8 is located on the opposite side of the damper device 10 from the turbine runner 5 within the front cover 3, is fitted axially movably relative to the damper hub 7, and faces an inner wall surface of the front cover 3 that is on the side toward the engine EG. Alternatively, the lockup clutch 8 may be a hydraulic, multi-plate clutch.

As illustrated in FIG. 1 and FIG. 2, the damper device 10 includes, as rotating elements, a drive member (an input element) 11 and a driven plate 15 (an output element). Further, the damper device 10 includes, as torque transmission elements (torque transmission elastic bodies), the following: multiple (according to the present embodiment, for example, six) first springs (first elastic bodies) SP1 that act in parallel between the drive member 11 and the driven plate 15 to transmit torque therebetween; and multiple (according to the present embodiment, for example, three) second springs (second elastic bodies) SP2 that are capable of acting in parallel between the drive member 11 and the driven plate 15 to transmit torque therebetween.

That is, as illustrated in FIG. 1, the damper device 10 has, between the drive member 11 and the driven plate 15, a first torque transmission path TP1 including the multiple first springs SP1, and a second torque transmission path TP2 including the multiple second springs SP2 and disposed parallel with the first torque transmission path TP1. According to the present embodiment, the multiple second springs SP2 in the second torque transmission path TP2 act parallel with the first springs SP1 in the first torque transmission path TP1, when the following conditions are both met: input torque (drive torque) to the drive member 11 or torque (driven torque) applied from an axle shaft to the driven plate 15 is greater than or equal to a torque T1 (a first threshold value) that is less than a torque T2 (a second threshold value) corresponding to a maximum torsion angle θmax of the damper device 10; and a torsion angle of the drive member 11 with respect to the driven plate 15 is greater than or equal to a predetermined angle θref. Thus, the damper device 10 has two levels (two stages) of damping characteristics.

Further, according to the present embodiment, linear coil springs that are made of a metal material helically wound in such a manner as to have an axis extending linearly under no load are used as the first and second springs SP1 and SP2. This allows the first and second springs SP1 and SP2 to expand and contract more appropriately along their axes than when arc coil springs are used. Thus, it is possible to reduce hysteresis, i.e., the difference between torque that is transmitted from the first springs SP1 to the driven plate 15 when a relative displacement between the drive member 11 (an input element) and the driven plate 15 (an output element) is increasing, and torque that is transmitted from the first springs SP1 to the driven plate 15 when the relative displacement between the drive member 11 and the driven plate 15 is decreasing. Alternatively, arc coil springs may be used as at least either the first springs SP1 or the second springs SP2.

As illustrated in FIG. 2, the drive member 11 of the damper device 10 includes the following: an annular first input plate 12 coupled to the lockup piston 80 of the lockup clutch 8; and an annular second input plate 13 that is coupled to the first input plate 12 via multiple rivets (coupling members) 90 (refer to FIG. 3) in such a manner as to face the first input plate 12. Thus, the drive member 11, i.e., the first and second input plates 12 and 13 rotate as a unit with the lockup piston 80, and the front cover 3 (the engine EG) is coupled to the drive member 11 of the damper device 10 through engagement of the lockup clutch 8.

Figure 3:
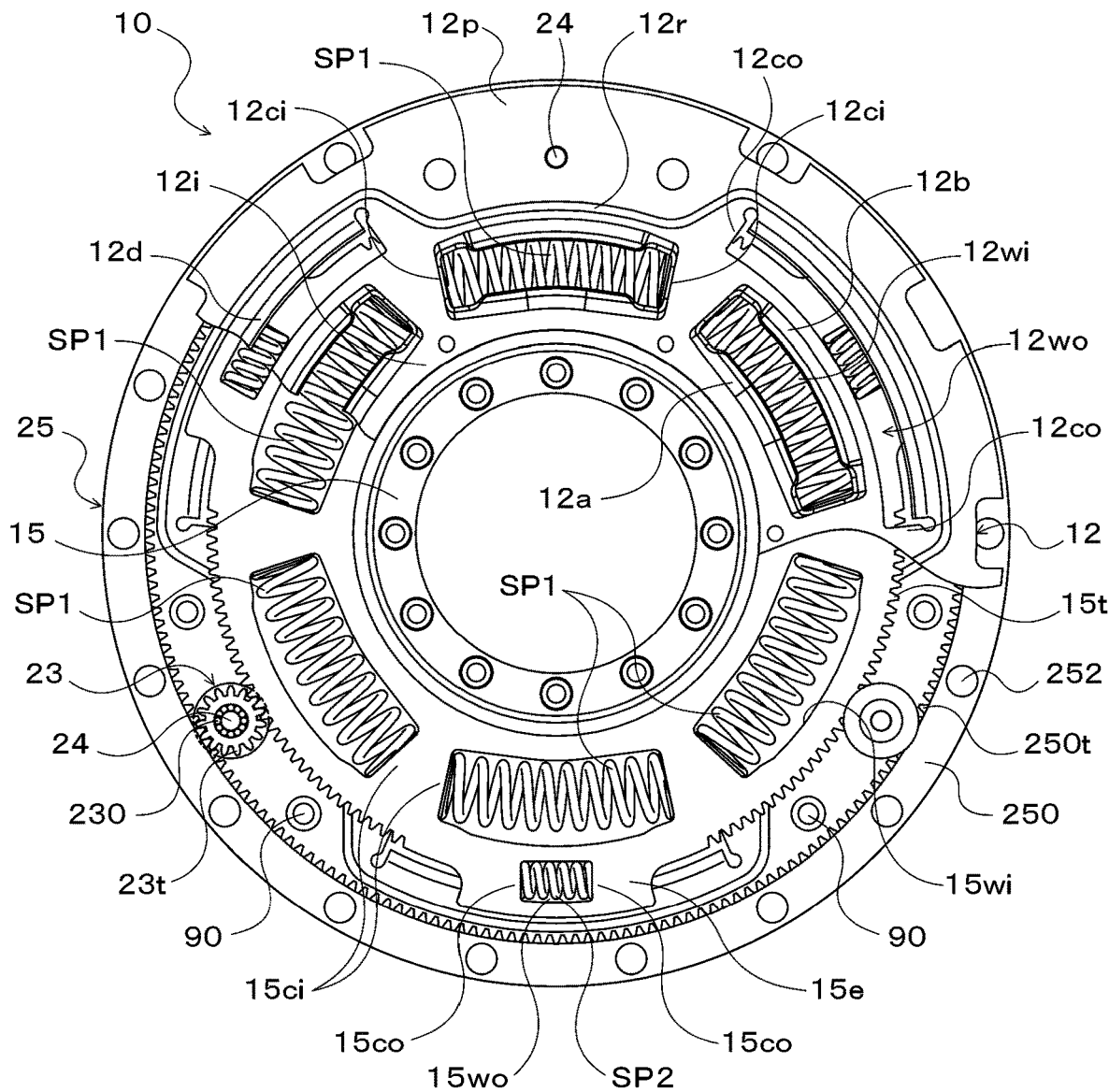
FIG. 3 is a front view of the damper device according to the present disclosure.

The first input plate 12 is an annular part formed by press working from a steel sheet or the like. As illustrated in FIG. 2 and FIG. 3, the first input plate 12 includes the following: multiple (according to the present embodiment, for example, six) inner spring holding windows (first holding windows) 12wi that each extend in an arc and that are spaced (equally spaced) from each other in the circumferential direction; multiple (according to the present embodiment, for example, six) spring supporting portions 12a that each extend along an inner edge of a corresponding one of the inner spring holding windows 12wi; multiple (according to the present embodiment, for example, six) spring supporting portions 12b that each extend along an outer edge of a corresponding one of the inner spring holding windows 12wi; and multiple (according to the present embodiment, for example, 12) inner spring contact portions 12ci that are provided on both sides of each of the inner spring holding window 12wi in the circumferential direction. As can be seen from FIG. 3, each of the inner spring holding windows 12wi has a circumferential length that is commensurate with the natural length of the first springs SP1.

Further, the first input plate 12 includes the following: multiple (according to the present embodiment, for example, three) outer spring holding windows (second holding windows) 12wo that each extend in an arc, that are spaced (equally spaced) from each other in the circumferential direction, and that are each located outward of a corresponding one of the inner spring holding windows 12wi in the radial direction; multiple (according to the present embodiment, for example, three) spring supporting portions 12d that each extend along an outer edge of a corresponding one of the outer spring holding windows 12wo; and multiple (according to the present embodiment, for example, six) outer spring contact portions 12co that are provided on both sides of each of the outer spring holding windows 12wo in the circumferential direction. As illustrated in FIG. 3, each of the outer spring holding windows 12wo has a circumferential length greater than the natural length of the second springs SP2.

An outer perimeter portion 12o of the first input plate 12 is formed in a flat annular shape and includes the following: multiple (according to the present embodiment, for example, three) pinion gear supporting portions 12p that are each located outward of a corresponding one of the outer spring holding windows 12wo in the radial direction and that are spaced (equally spaced) from each other in the circumferential direction; and portions that are each located outward of the corresponding outer spring holding window 12wo. Further, the outer perimeter portion 12o of the first input plate 12 is offset over its entire perimeter, from an inner perimeter portion 12i including the multiple inner spring holding windows 12wi and the multiple outer spring holding windows 12wo, in the axial direction of the damper device 10 toward the spring supporting portions 12a, 12b, and 12d. The outer perimeter portion 12o connects to the inner perimeter portion 12i via an endless joint portion 12r that has a short tubular shape and that extends along the multiple pinion gear supporting portions 12p and the multiple outer spring holding windows 12wo.

The second input plate 13 is an annular part formed by press working from a steel sheet or the like. As illustrated in FIG. 2 and FIG. 3, the second input plate 13 includes the following: multiple (according to the present embodiment, for example, six) inner spring holding windows (first holding windows) 13wi that each extend in an arc and that are spaced (equally spaced) from each other in the circumferential direction; multiple (according to the present embodiment, for example, six) spring supporting portions 13a that each extend along an inner edge of a corresponding one of the inner spring holding windows 13wi; multiple (according to the present embodiment, for example, six) spring supporting portions 13b that each extend along an outer edge of a corresponding one of the inner spring holding windows 13wi; and multiple (according to the present embodiment, for example, 12) inner spring contact portions 13ci that are provided on both sides of each of the inner spring holding windows 13wi in the circumferential direction. As with the inner spring holding windows 12wi of the first input plate 12, each of the inner spring holding windows 13wi has a circumferential length that is commensurate with the natural length of the first springs SP1.

Further, the second input plate 13 includes the following: multiple (according to the present embodiment, for example, three) outer spring holding windows (second holding windows) 13wo that each extend in an arc, that are spaced (equally spaced) from each other in the circumferential direction, and that are each located outward of a corresponding one of the inner spring holding windows 13wi in the radial direction; multiple (according to the present embodiment, for example, three) spring supporting portions 13d that each extend along an outer edge of a corresponding one of the outer spring holding windows 13wo; and multiple (according to the present embodiment, for example, six) outer spring contact portions 13co that are provided on both sides of each of the outer spring holding windows 13wo in the circumferential direction. As with the outer spring holding windows 12wo of the first input plate 12, each of the outer spring holding windows 13wo has a circumferential length greater than the natural length of the second springs SP2.

An outer perimeter portion 13o of the second input plate 13 is formed in a flat annular shape and includes the following: multiple (according to the present embodiment, for example, three) pinion gear supporting portions 13p that are each located outward of a corresponding one of the outer spring holding windows 13wo in the radial direction and that are spaced (equally spaced) from each other in the circumferential direction; and portions that are each located outward of the corresponding outer spring holding window 13wo. Further, the outer perimeter portion 13o of the second input plate 13 is offset over its entire perimeter, from an inner perimeter portion 13i including the multiple inner spring holding windows 13wi and the multiple outer spring holding windows 13wo, in the axial direction of the damper device 10 toward the spring supporting portions 13a, 13b, and 13d. The outer perimeter portion 13o connects to the inner perimeter portion 13i via an endless joint portion 13r that has a short tubular shape and that extends along the multiple pinion gear supporting portions 13p and the multiple outer spring holding windows 13wo. According to the present embodiment, the first and second input plates 12 and 13 have the same shape to reduce the number of types of parts.

The driven plate (an output plate) 15 is an annular plate-like part formed by press working from a steel sheet or the like. The driven plate 15 is located between the first and second input plates 12 and 13 in the axial direction, and is fixed to the damper hub 7 via multiple rivets. As illustrated in FIG. 2 and FIG. 3, the driven plate 15 includes the following: multiple (according to the present embodiment, for example, six) inner spring retaining windows (first retaining windows) 15wi that are spaced (equally spaced) from each other in the circumferential direction; multiple (according to the present embodiment, for example, 12) inner spring contact portions 15ci that are provided on both sides of each of the inner spring holding windows 12wi in the circumferential direction; multiple (according to the present embodiment, for example, three) outer spring retaining windows 15wo (second retaining windows) that are each located outward of a corresponding one of the inner spring retaining windows 15wi in the radial direction; multiple (according to the present embodiment, for example, six) outer spring contact portions 15co that are provided on both sides of each of the outer spring holding windows 12wo in the circumferential direction.

As can be seen from FIG. 3, each of the inner spring retaining windows 15wi has a circumferential length that is commensurate with the natural length of the first springs SP1, and as can be seen from FIG. 3, each of the outer spring retaining windows 15wo has a circumferential length that is commensurate with the natural length of the second springs SP2. Further, according to the present embodiment, the driven plate 15 includes multiple (according to the present embodiment, for example, three) protrusions 15e that protrude from its outer perimeter portion outward in the radial direction and that are spaced (equally spaced) from each other in the circumferential direction. Each of the outer spring retaining windows 15wo is formed to a corresponding one of the protrusions 15e.

Each of the first springs SP1 is located (fitted) in a corresponding one of the inner spring retaining windows 15wi of the driven plate 15, and the multiple first springs SP1 are disposed on the same circumference. Further, the inner spring contact portions 15ci provided on both sides of each of the inner spring retaining windows 15wi in the circumferential direction are in abutment with one or the other end of the first spring SP1 in the inner spring retaining window 15wi. In contrast, each of the second springs SP2 is located (fitted) in a corresponding one of the outer spring retaining windows 15wo of the driven plate 15, and the multiple second springs SP2 are disposed on the same circumference at a location outward of the multiple first springs SP1 in the radial direction of the driven plate 15. Further, the outer spring contact portions 15co provided on both sides of each of the outer spring retaining windows 15wo in the circumferential direction are in abutment with one or the other end of the second spring SP2 in the outer spring retaining window 15wo.

The first and second input plates 12 and 13 of the drive member 11 are coupled together by the multiple rivets 90 to sandwich the driven plate 15, the multiple first springs SP1, and the multiple second springs SP2 therebetween from both sides in the axial direction of the damper device 10. Thus, a side portion of each of the first springs SP1 is held in the corresponding inner spring holding windows 12wi and 13wi of the first and second input plates 12 and 13 and is supported (guided) by the spring supporting portions 12a and 13a from inside in the radial direction. Further, each of the first springs SP1 is supportable (guidable) by the spring supporting portions 12b and 13b of the first and second input plates 12 and 13 that are located outward thereof in the radial direction. Further, with the damper device 10 mounted, the inner spring contact portions 12ci provided on both sides of each of the inner spring holding windows 12wi in the circumferential direction and the inner spring contact portions 13ci provided on both sides of each of the inner spring holding windows 13wi in the circumferential direction are in abutment with one or the other end of the first spring SP1 in the inner spring holding windows 12wi and 13wi. Thus, the drive member 11 and the driven plate 15 are coupled together via the multiple first springs SP1.

Further, the side portion of each of the second springs SP2 is held in the corresponding outer spring holding windows 12wo and 13wo of the first and second input plates 12 and 13 and is thus supportable (guidable) by the spring supporting portions 12d and 13d that are located outward thereof in the radial direction. With the damper device 10 mounted, each of the second springs SP2 is located substantially in the middle of the outer spring holding windows 12wo and 13wo in the circumferential direction and is not in abutment with any of the outer spring contact portions 12co and 13co of the first and second input plates 12 and 13. When input torque (drive torque) to the drive member 11 or torque (driven torque) applied from an axle shaft to the driven plate 15 reaches the torque T1, and a torsion angle of the drive member 11 with respect to the driven plate 15 becomes greater than or equal to the predetermined angle θref, the second springs SP2 come into abutment at one end with either of the outer spring contact portions 12co and 13co that are provided on both sides of the corresponding outer spring holding windows 12wo and 13wo of the first and second input plates 12 and 13.

The damper device 10 further includes a stopper ST that restricts relative rotation between the drive member 11 and the driven plate 15. When the input torque to the drive member 11 reaches the torque T2 corresponding to the maximum torsion angle θmax of the damper device 10, the stopper ST restricts relative rotation between the drive member 11 and the driven plate 15, and deflection of all of the first and second springs SP1 and SP2 is restricted accordingly. According to the present embodiment, the stopper ST is structured with the following: multiple rivets 90 that couple together the first and second input plates 12 and 13 of the drive member 11; and the protrusions 15e of the driven plate 15. That is, when at least any of the multiple rivets 90 comes into abutment with a circumferential end of the corresponding protrusion 15e of the driven plate 15, the relative rotation between the drive member 11 and the driven plate 15 is restricted.

Further, the damper device 10 includes, as illustrated in FIG. 1 and FIG. 2, a rotary inertia mass damper 20 that is provided parallel with both the first torque transmission path TP1 including the multiple first springs SP1 and the second torque transmission path TP2 including the multiple second springs SP2. According to the present embodiment, the rotary inertia mass damper 20 has a single-pinion-type planetary gear 21 (refer to FIG. 1) located between the drive member 11 and the driven plate 15, which are respectively an input element and an output element of the damper device 10.

The planetary gear 21 is structured with the following: the driven plate 15 that includes external teeth 15t on its outer circumference and that serves as a sun gear of the rotary inertia mass damper 20 (the planetary gear 21); the first and second input plates 12 and 13 of the drive member 11 that serve as a carrier to rotatably support multiple (according to the present embodiment, for example, three) pinion gears 23 meshing with the external teeth 15t; and a ring gear 25 meshing with the pinion gears 23 and disposed concentric with the driven plate 15 (the external teeth 15O as the sun gear. The driven plate 15 as the sun gear, the multiple pinion gears 23, and the ring gear 25 at least partially overlap the first and second springs SP1 and SP2 within a fluid chamber 9 when viewed in the radial direction of the damper device 10. Thus, it is possible to reduce the axial length of the rotary inertia mass damper 20, and in turn, the axial length of the damper device 10.

Figure 4:
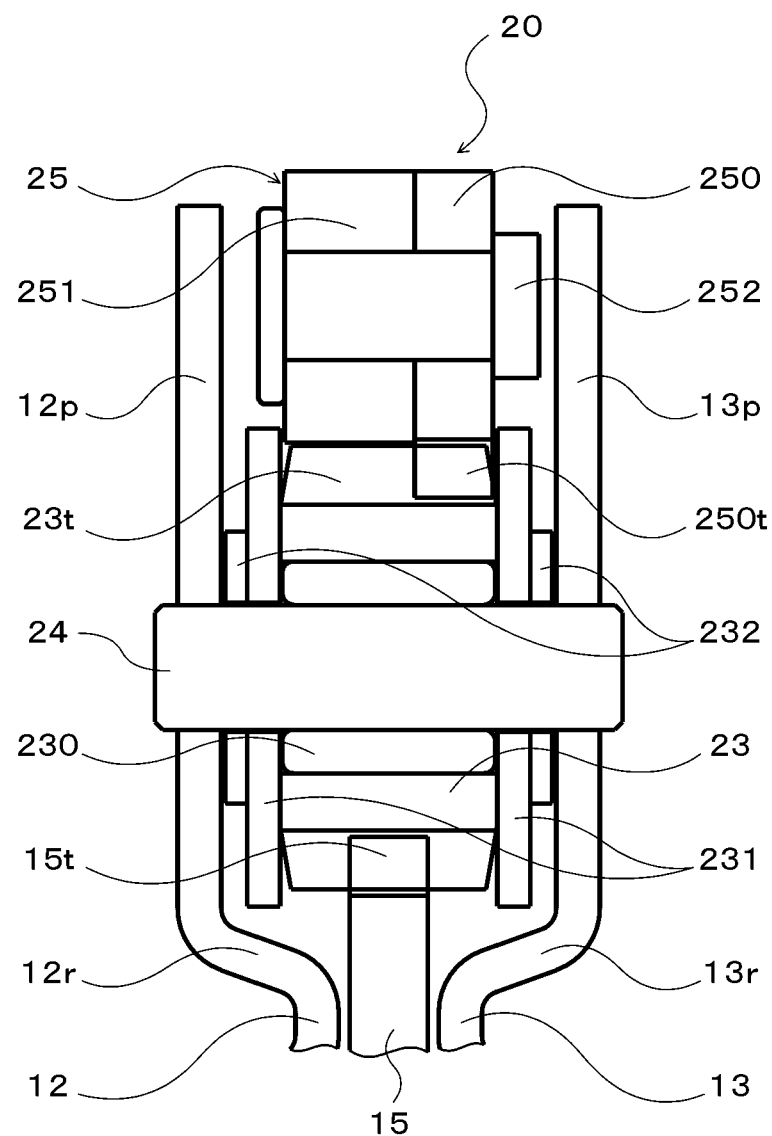
FIG. 4 is an enlarged view of a main portion illustrating a rotary inertia mass damper of the damper device according to the present disclosure.

As illustrated in FIG. 2 and FIG. 4, the external teeth 15t are formed at predetermined multiple positions on the outer circumferential surface of the driven plate 15 and are spaced (equally spaced) from each other in the circumferential direction. That is, according to the present embodiment, the external teeth 15t are formed between circumferentially adjacent ones of the protrusions 15e on the outer circumferential surface of the driven plate 15. Thus, the external teeth 15t are located radially outward of the inner spring retaining windows 15wi, i.e., the first springs SP1 that transmit torque between the drive member 11 and the driven plate 15. Alternatively, if the protrusions 15e are not formed on the driven plate 15, then the external teeth 15t may be formed on the entire circumference of the driven plate 15.

Each of the pinion gear supporting portions 12p of the first input plate 12 that structure the planetary gear 21 faces a corresponding one of the pinion gear supporting portions 13p of the second input plate 13, and the pinion gear supporting portions 12p and 13p that are paired support corresponding ends of a pinion shaft 24 inserted through the pinion gear 23. Thus, the multiple pinion gears 23 of the planetary gear 21 are circumferentially aligned with the multiple second springs SP2 that are located outward of the multiple first springs SP1 in the radial direction of the driven plate 15 and that are located inward of the ring gear 25 in the radial direction of the driven plate 15. Further, rivets 90 for fastening the first and second input plates 12 and 13 together are provided on both sides of the pinion shaft 24 in the circumferential direction.

As illustrated in FIG. 4, the pinion gear 23 is an annular member with external teeth 23t on its outer circumference, and the face width of the pinion gear 23 is set greater than the face width of the external teeth 15t, i.e., the thickness of the driven plate 15. Further, multiple needle bearings 230 are located between the inner circumferential surface of the pinion gear 23 and the outer circumferential surface of the pinion shaft 24. Further, a pair of large diameter washers 231 are located on both sides of each of the pinion gears 23 in the axial direction, and a pair of small diameter washers 232 smaller in diameter than the large diameter washers 231 are located between the large diameter washer 231 and the pinion gear supporting portion 12p or 13p.

As illustrated in FIG. 4, the ring gear 25 of the planetary gear 21 includes the following: an annular annulus gear 250 having internal teeth 250t formed on its inner circumference; a weight body 251 located in contact with one side surface (left side surface in FIG. 4) of the annulus gear 250; and multiple rivets 252 for fastening the annulus gear 250 and the weight body 251 together. The annulus gear 250 and the weight body 251 are each an annular part formed by press working from a steel sheet or the like. The internal teeth 250t of the annulus gear 250 are formed on the entire inner circumferential surface of the annulus gear 250. Alternatively, the internal teeth 250t may be formed at predetermined multiple positions on the inner circumferential surface of the annulus gear 250 and may be spaced (equally spaced) from each other in the circumferential direction. The face width of the annulus gear 250 is less than the face width of the pinion gears 23 and is substantially equal to the face width of the external teeth 15t, i.e., the thickness of the driven plate 15.

Further, according to the present embodiment, the weight body 251 is a circular annular member having a concave cylindrical, inner circumferential surface. The weight body 251 has an outside diameter substantially equal to the outside diameter of the annulus gear 250 and has an inside diameter slightly less than the root radius of the internal teeth 250t. According to the present embodiment, the axial length (thickness) of the weight body 251 is set such that the sum of the axial length of the weight body 251 and the axial length (thickness) of the annulus gear 250 is substantially equal to the axial length of the pinion gear 23. The annulus gear 250, the weight body 251, and the multiple rivets 252 are integrated to serve as a mass body (an inertial mass body) of the rotary inertia mass damper 20. Using the ring gear 25 located in the radially outermost portion of the planetary gear 21 as a mass body of the rotary inertia mass damper 20 in this way increases the moment of inertia of the ring gear 25, thus making is possible to further improve vibration damping performance of the rotary inertia mass damper 20. Alternatively, the weight body 251 may include multiple segments that are formed by dividing a circular annular member like the one described above and that are fixed to the annulus gear 250 via the rivets 252.

Figure 5:
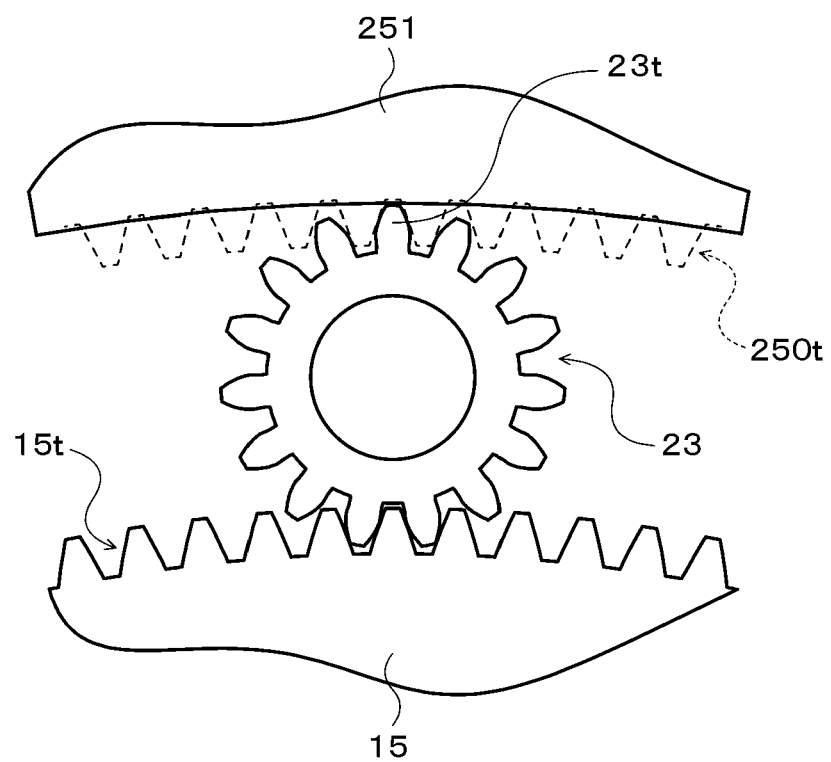
FIG. 5 is an enlarged view of a main portion illustrating the rotary inertia mass damper of the damper device according to the present disclosure.

As illustrated in FIG. 4, the annulus gear 250 of the ring gear 25 is located radially offset from the driven plate 15 as a sun gear, and the internal teeth 250t of the annulus gear 250 mesh with an axial end of each of the pinion gears 23. Further, as illustrated in FIG. 5, the inner circumferential surface of the weight body 251 of the ring gear 25 is supported in the radial direction by the tips of the external teeth 23t of the pinion gears 23, and thus the ring gear 25 as a whole is accurately aligned with the axis of the first and second input plates 12 and 13 as a carrier and the axis of the driven plate 15 as a sun gear. In addition, movement of the ring gear 25 in the axial direction is restricted by the large diameter washers 231 that are abuttable with a side surface of the annulus gear 250 (the internal teeth 250t) and by the large diameter washers 231 that are abuttable with a side surface of the weight body 251.

That is, the outside diameter of the large diameter washers 231 is set such that when each of the pinion gears 23 meshes with the internal teeth 250t of the ring gear 25, the large diameter washer 231 faces a side surface of the pinion gear 23 and faces the side surface of the internal teeth 250t or the side surface of the weight body 251 of the ring gear 25. More specifically, the outer perimeter portion of the large diameter washer 231 according to the present embodiment projects outward in the radial direction beyond a bottom land of the internal teeth 250t of the ring gear 25 and the inner circumferential surface of the weight body 251. Further, according to the present embodiment, the outside diameter of the small diameter washers 232 is smaller than the root circle of the external teeth 23t of the pinion gears 23, and the outer edges of the small diameter washers 232 are located outward of the needle bearings 230 in the radial direction.

The following is an explanation of the operation of the starting apparatus 1 structured as described above.

In the starting apparatus 1, with the lockup clutch 8 releasing the lockup, as can be seen from FIG. 1, torque (power) transmitted from the engine EG to the front cover 3 is transmitted to the input shaft IS of the transmission TM through a path including the pump impeller 4, the turbine runner 5, and the damper hub 7. In contrast, when the lockup is executed by the lockup clutch 8 of the starting apparatus 1, torque transmitted from the engine EG to the drive member 11 via the front cover 3 and the lockup clutch 8 is transmitted to the driven plate 15 and the damper hub 7 via a rotary inertia mass damper 20 and the first torque transmission path TP1 including the multiple first springs SP1 as long as the following conditions are both met: the input torque or the other is less than the torque T1; and the torsion angle of the drive member 11 with respect to the driven plate 15 is less than the predetermined angle θref.

In this case, as the drive member 11 rotates (twists) relative to the driven plate 15, the multiple first springs SP1 deflect while the ring gear 25 as a mass body rotates (swings) about the axis in accordance with the relative rotation between the drive member 11 and the driven plate 15. When the drive member 11 rotates (swings) relative to the driven plate 15 in this way, the rotation speed of the drive member 11, which is an input element of the planetary gear 21 and serves as a carrier, i.e., the rotation speed of the first and second input plates 12 and 13 becomes higher than the rotation speed of the driven plate 15, which serves as a sun gear. Consequently, at this time, the ring gear 25 is accelerated by the action of the planetary gear 21 and rotates at a higher speed than the drive member 11. Thus, inertia torque is applied via the pinion gears 23 from the ring gear 25, which is a mass body of the rotary inertia mass damper 20, to the driven plate 15, which is an output element of the damper device 10, so that vibration of the driven plate 15 can be damped.

More specifically, when the multiple first springs SP1 and the rotary inertia mass damper 20 act in parallel, torque (average torque) transmitted from the multiple first springs SP1 (the first torque transmission path TP1) to the driven plate 15 depends on (is proportional to) the displacement (the amount of deflection, i.e., the torsion angle) of the first springs SP1. In contrast, torque (inertia torque) transmitted from the rotary inertia mass damper 20 to the driven plate 15 depends on (is proportional to) the difference in angular acceleration between the drive member 11 and the driven plate 15, i.e., the second derivative of displacement of the first springs SP1 between the drive member 11 and the driven plate 15. Therefore, assuming that input torque transmitted to the drive member 11 of the damper device 10 vibrates periodically, vibration transmitted from the drive member 11 to the driven plate 15 via the multiple first springs SP1 have a phase shift of 180 degrees with respect to vibration transmitted from the drive member 11 to the driven plate 15 via the rotary inertia mass damper 20. Thus, the damper device 10 makes it possible that one of the vibration transmitted from the multiple first springs SP1 to the driven plate 15 and the vibration transmitted from the rotary inertia mass damper 20 to the driven plate 15 at least partially cancels the other to effectively damp the vibration of the driven plate 15. It is noted that between the drive member 11 and the driven plate 15, the rotary inertia mass damper 20 transmits mainly the inertia torque and does not transmit the average torque.

Further, when the input torque or the other becomes greater than or equal to the torque T1, and the torsion angle of the drive member 11 with respect to the driven plate 15 becomes greater than or equal to the predetermined angle θref, one end of each of the second springs SP2 comes into abutment with one of the outer spring contact portions 12co and 13co that are provided on both sides of the corresponding outer spring holding windows 12wo and 13wo of the first and second input plates 12 and 13. Thus, until the stopper ST restricts the relative rotation between the drive member 11 and the driven plate 15 because the input torque or the other torque reaches the torque T2, the torque transmitted to the drive member 11 is transmitted to both the driven plate 15 and the damper hub 7 via the first torque transmission path TP1, the second torque transmission path TP2 including the multiple second springs SP2, and the rotary inertia mass damper 20. That is, in the damper device 10, the multiple second springs SP2 do not transmit torque (do not deflect) until coming into abutment with both the corresponding outer spring contact portions 15co of the driven plate 15 and the outer spring contact portions 12co and 13co of the first and second input plates 12 and 13, and when the torsion angle between the drive member 11 and the driven plate 15 increases, the second springs SP2 act in parallel with the first springs SP1. This increases the stiffness of the damper device 10 in accordance with an increase in torsion angle between the drive member 11 and the driven plate 15, thus making it possible to transmit large torque or to receive impact torque or the like using the first and second springs SP1 and SP2 acting in parallel.

In the damper device 10, the ring gear 25 of the rotary inertia mass damper 20 includes the following: the annulus gear 250 having the internal teeth 250t that mesh with the pinion gears 23; and the weight body 251 located in contact with one side surface of the annulus gear 250 and fixed to the annulus gear 250 via the multiple rivets 252. In addition, the inner circumferential surface of the weight body 251 is supported in the radial direction by the tips of the external teeth 23t of the pinion gear 23. Consequently, there is no need to provide on the pinion gear 23, a radial direction supporting portion dedicated to supporting the ring gear 25 in the radial direction, and an external gear having a simple structure can be adopted as the pinion gear 23. It is thus possible to suppress an increase in cost that results from an increase in the number of assembly parts of the pinion gear 23 and from an increase in the number of steps of the manufacturing and assembly processes.

Since the inner circumferential surface of the weight body 251 of the ring gear 25 is supported in the radial direction by the tips of the external teeth 23t, the ring gear 25 can be accurately aligned with the axis of the first and second input plates 12 and 13 serving as a carrier and the axis of the driven plate 15 serving as a sun gear so that the ring gear 25 can rotate (pivot) smoothly. Thus, a vibration damping effect of the rotary inertia mass damper 20 can be further improved. In the damper device 10, it is also possible to adjust the weight of the weight body 251 to appropriately set the moment of inertia of the ring gear 25 so as to further improve the vibration damping effect of the rotary inertia mass damper 20. In addition, the number of assembly parts of the ring gear 25 can be decreased by providing the weight body 251 on only one side surface of the annulus gear 250 of the ring gear 25.

As a result, it is possible to further improve the vibration damping effect of the rotary inertia mass damper 20 while suppressing an increase in the number of assembly parts of the damper device 10 and an increase in cost. Since an intermediate element is omitted from the damper device 10, it is possible to suppress an increase in cost.

Figure 6:
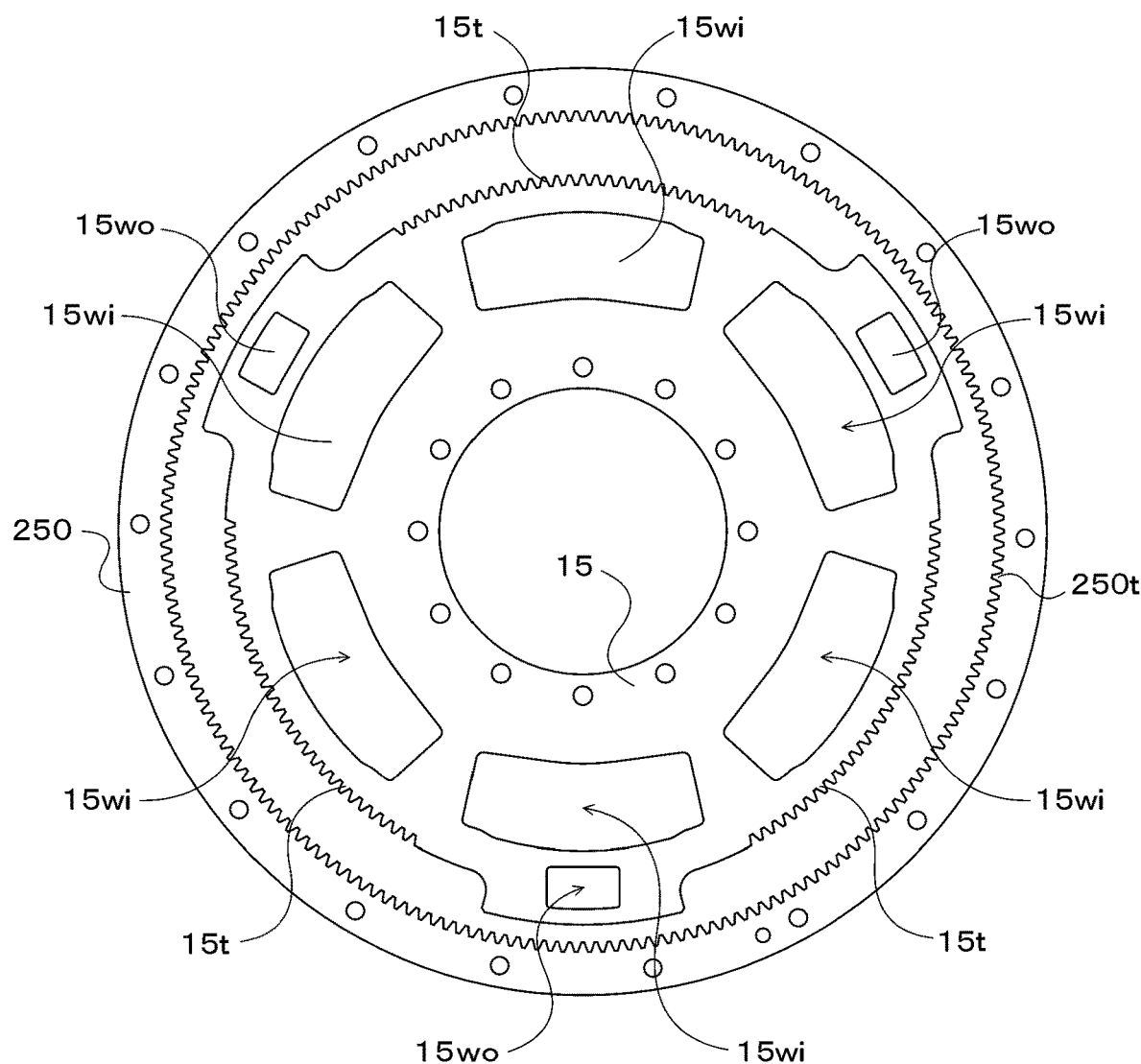
FIG. 6 is a plan view of a driven plate and an annulus gear included in the damper device according to the present disclosure.

In the embodiment described above, the face widths of the internal teeth 250t of the annulus gear 250 and the external teeth 15t of the driven plate 15 are smaller than the face width of the pinion gear 23, and the annulus gear 250 is located offset from the external teeth 15t in the axial direction. Consequently, it is possible to increase the axial length (thickness) of the weight body 251 to further increase the moment of inertia of the ring gear 25 and also sufficiently ensure an area of the weight body 251 that is supported by the tips of the external teeth 23t of the pinion gear 23 to improve the alignment accuracy of the ring gear 25. Further, when the face widths of the annulus gear 250 of the ring gear 25 and the external teeth 15t are both made less than the face width of the pinion gears 23, the driven plate 15 and the annulus gear 250 that are formed by press working can be formed by so-called nesting, as can be seen from FIG. 6. Thus, a base material can be efficiently used to improve yield.

In addition, in the embodiment described above, movement of the ring gear 25 in the axial direction is restricted by the large diameter washers 231 that are located on a side of each pinion gear 23 of the rotary inertia mass damper 20 and that are abuttable with a side surface of the annulus gear 250 and by the large diameter washers 231 that are abuttable with a side surface of the weight body 251. In this way, it is possible to satisfactorily reduce hysteresis of the rotary inertia mass damper 20 compared to the case where movement of the ring gear 25 in the axial direction is restricted by the first and second input plates 12 and 13 that function as carrier of the planetary gear 21.

Figure 7:
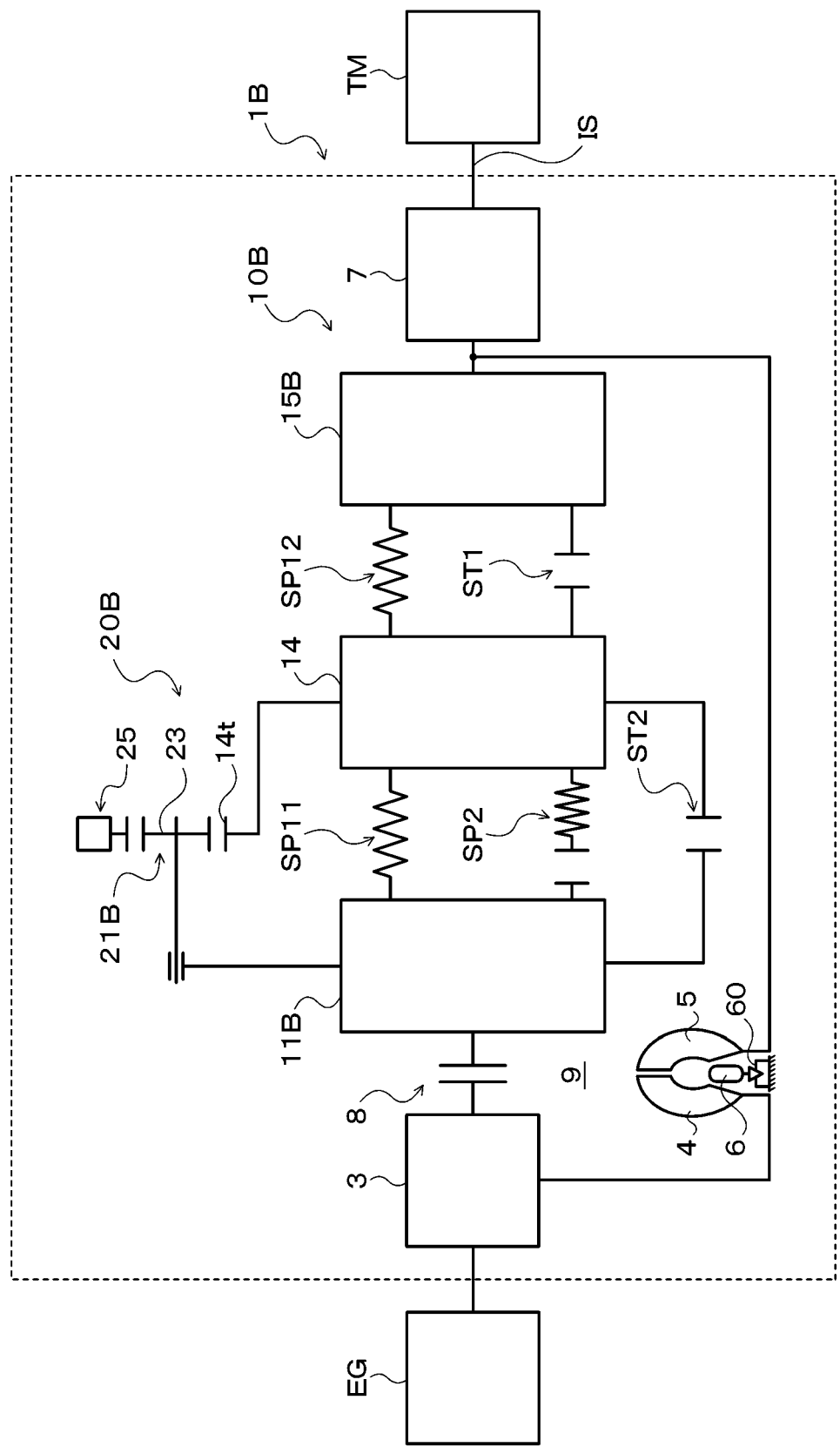
FIG. 7 is a schematic diagram of a starting apparatus including another damper device according to the present disclosure.
Figure 8:
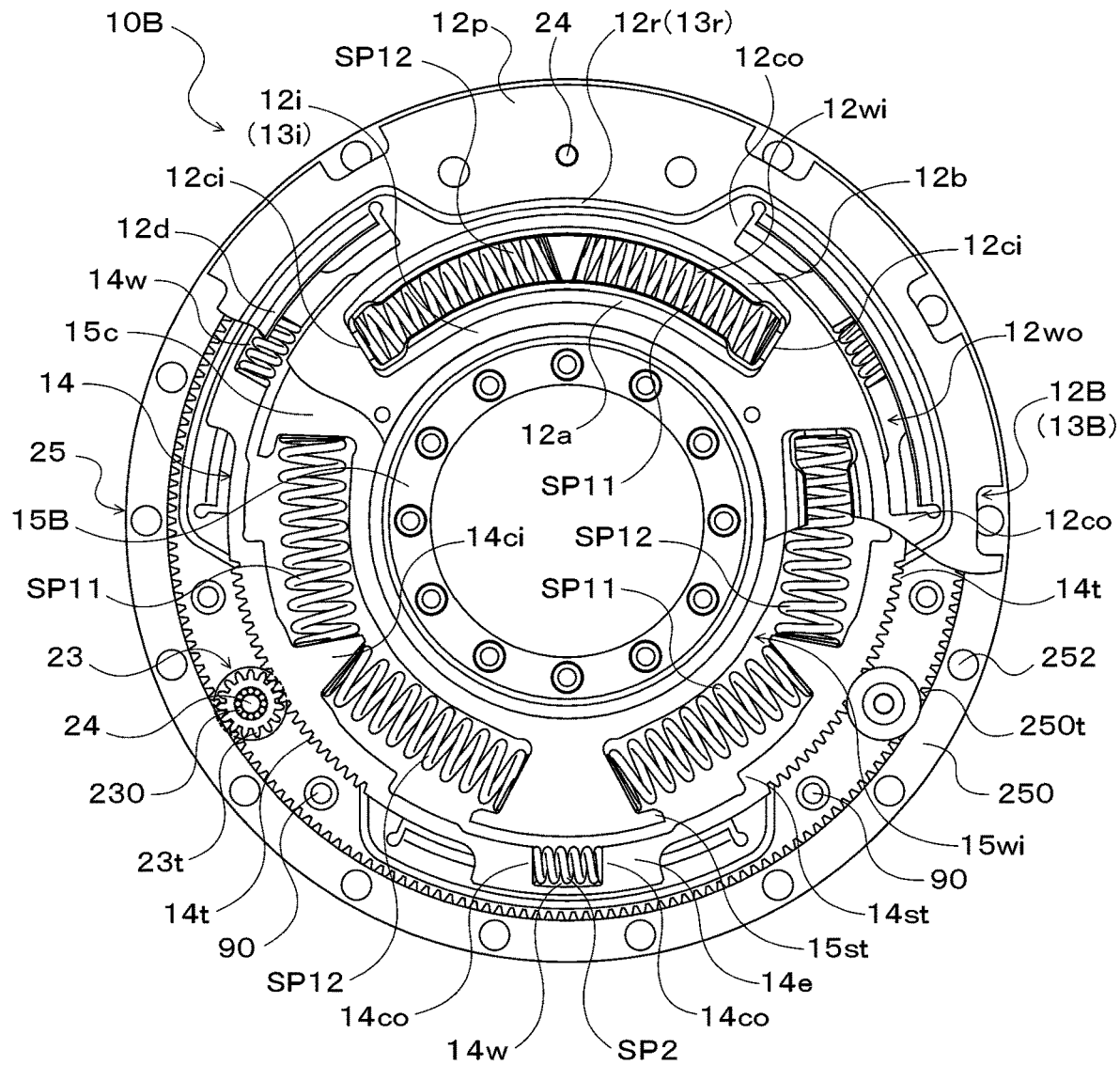
FIG. 8 is a front view illustrating the other damper device according to the present disclosure.

FIG. 7 is a schematic diagram illustrating a starting apparatus 1B including another damper device 10B according to the present disclosure, and FIG. 8 is a front view illustrating the damper device 10B. Elements of the starting apparatus 1B and the damper device 10B that are the same as those of the starting apparatus 1 and the like described above are denoted by the same reference characters, and their redundant description will be omitted.

The damper device 10B illustrated in FIGS. 7 and 8 includes, as rotating elements, the following: a drive member (an input element) 11B; an intermediate plate (an intermediate element) 14; and a driven plate (an output element) 15B. Further, the damper device 10B includes, as torque transmission elements (torque transmission elastic bodies), the following: multiple (according to the present embodiment, for example, three) input springs (input elastic bodies) SP11 that transmit torque between the drive member 11B and the intermediate plate 14; multiple (according to the present embodiment, for example, three) output springs (output elastic bodies) SP12 that transmit torque between the intermediate plate 14 and the driven plate 15B; and multiple (according to the present embodiment, for example, three) second springs (second elastic bodies) SP2 that can transmit torque between the drive member 11B and the intermediate plate 14.

The drive member 11B of the damper device 10B includes first and second input plates 12B and 13B that serve as a carrier of a planetary gear 21B of a rotary inertia mass damper 20B. The first and second input plates 12B and 13B have basically the same structure as the drive member 11 of the damper device 10 and are parts formed by press working. It is noted that as illustrated in FIG. 8, the inner spring holding windows 12wi and the like and the spring supporting portions 12a and 12b and the like of the first and second input plates 12B and 13B have a circumferential length greater than the sum of the natural length of the input springs SP11 and the natural length of the output springs SP12. The driven plate 15B is an annular part formed by press working and includes, as illustrated in FIG. 8, multiple (according to the present embodiment, for example, three) spring abutment portions 15c that protrude from its outer perimeter outward in the radial direction and that are spaced (equally spaced) from each other in the circumferential direction. Further, a notched, inner spring retaining window 15wi extending in an arc is formed between circumferentially adjacent ones of the spring abutment portions 15c.

The intermediate plate 14 is an annular part formed by press working from a steel sheet or the like, and includes external teeth 14t on its outer circumference to serve as a sun gear of the rotary inertia mass damper 20B (the planetary gear 21B). That is, the rotary inertia mass damper 20B of the damper device 10B is structured with the following: the intermediate plate 14 that includes the external teeth 14t on its outer circumference to serve as a sun gear; the first and second input plates 12B and 13B of the drive member 11B that serve as a carrier to rotatably support multiple (according to the present embodiment, for example, three) pinion gears 23 meshing with the external teeth 14t; and a ring gear 25 meshing with the pinion gears 23 and disposed concentric with the intermediate plate 14 (the external teeth 14t) as a sun gear to serve as a mass body.

As illustrated in FIG. 8, the intermediate plate 14 includes, in addition to the external teeth 14t on its outer circumference, the following: multiple (according to the present embodiment, for example, three) inner spring abutment portions 14ci that protrude from its inner perimeter inward in the radial direction and that are spaced (equally spaced) from each other in the circumferential direction; multiple (according to the present embodiment, for example, three) protrusions 14e that protrude from its outer perimeter outward in the radial direction and that are spaced (equally spaced) from each other in the circumferential direction; multiple (according to the present embodiment, for example, three) spring retaining windows 14w that are cutout portions and are each formed in a corresponding one of the protrusions 14e; and multiple (according to the present embodiment, for example, six) outer spring abutment portions 14co provided on both sides of each of the spring retaining windows 14w in the circumferential direction. As illustrated in FIG. 8, each of the spring retaining windows 14w has a circumferential length that is commensurate with the natural length of the second springs SP2. The external teeth 14t are formed between circumferentially adjacent ones of the protrusions 14e.

Each pair of the input spring SP11 and the output spring SP12 that act in series is located in a corresponding one of the inner spring retaining windows 15wi of the driven plate 15B. Further, the driven plate 15B is surrounded by the intermediate plate 14, and the inner spring abutment portion 14*ci* of the intermediate plate 14 is located between the input spring SP11 and the output spring SP12 in each of the inner spring retaining windows 15*wi* to be in abutment with ends of both springs. Thus, with the damper device 10B mounted, one end of each of the input springs SP11 is in abutment with a corresponding one of the spring abutment portions 15*c* of the driven plate 15B, and the other end of each of the input springs SP11 is in abutment with a corresponding one of the inner spring abutment portions 14*ci* of the intermediate plate 14. Likewise, with the damper device 10B mounted, one end of each of the output springs SP12 is in abutment with a corresponding one of the inner spring abutment portions 14*ci* of the intermediate plate 14, and the other end of each of the output springs SP12 is in abutment with a corresponding one of the spring abutment portions 15*c* of the driven plate 15B. Further, each of the second springs SP2 is located (fitted) in a corresponding one of the spring retaining windows 14*w* of the intermediate plate 14, and the outer spring abutment portions 14*co* provided on both sides of each of the spring retaining windows 14*w* in the circumferential direction are in abutment with one or the other end of the second spring SP2 in the spring retaining window 14*w*.

The first and second input plates 12B and 13B of the drive member 11B are coupled together via multiple rivets 90 such that the intermediate plate 14, the driven plate 15B, the multiple input springs SP11, the multiple output springs SP12, and the multiple second springs SP2 are all sandwiched therebetween in the axial direction of the damper device 10B. Thus, a side portion of each pair of the input spring SP11 and the output spring SP12 is held in the corresponding inner spring holding window 12*wi* and the like of the first and second input plates 12B and 13B and is supported (guided) from inside in the radial direction by the spring supporting portion 12*a* and the like. Further, each pair of the input spring SP11 and the output spring SP12 is supportable (guidable) by the spring supporting portion 12*b* and the like of the first and second input plates 12B and 13B that are located outward thereof in the radial direction. Further, with the damper device 10B mounted, the inner spring contact portions 12*ci* provided on both sides of each of the inner spring holding windows 12*wi* in the circumferential direction and the inner spring contact portions provided on both sides of each of the inner spring holding windows of the second input plate 13B in the circumferential direction are in abutment with the one end of the input spring SP11 or the other end of the output spring SP12 in the inner spring holding window 12*wi* and the like. Thus, the drive member 11B and the driven plate 15B are coupled together via the multiple input springs SP11, the intermediate plate 14, and the multiple output springs SP12.

Further, the side portion of each of the second springs SP2 is held in the corresponding outer spring holding window 12*wo* and the like of the first and second input plates 12B and 13B and is thus supportable (guidable) by the spring supporting portion 12*d* and the like that are located outward thereof in the radial direction. With the damper device 10B mounted, each of the second springs SP2 is located substantially in the middle of the outer spring holding window 12*wo* and the like in the circumferential direction and is not in abutment with any of the outer spring contact portion 12*co* and the like of the first and second input plates 12B and 13B. When input torque (drive torque) to the drive member 11B or torque (driven torque) applied from an axle shaft to the driven plate 15B reaches a predetermined torque T1 (a first threshold value), and a torsion angle of the drive member 11B with respect to the driven plate 15B becomes greater than or equal to a predetermined angle θref, the second springs SP2 come into abutment at one end with either of the outer spring contact portions 12*co* and the like that are provided on both sides of the corresponding outer spring holding window 12*wo* and the like of the first and second input plates 12B and 13B.

Further, as illustrated in FIG. 7, the damper device 10B includes a first stopper ST1 that restricts relative rotation between the intermediate plate 14 and the driven plate 15B, and a second stopper ST2 that restricts relative rotation between the drive member 11B and the intermediate plate 14. The first stopper ST1 restricts relative rotation between the intermediate plate 14 and the driven plate 15B, when the input torque to the drive member 11B or the torque applied from the axle shaft to the driven plate 15B reaches the torque T1, and the torsion angle of the drive member 11B with respect to the driven plate 15B becomes greater than or equal to the predetermined angle θref. In the damper device 10B, the first stopper ST1 is structured with the following: multiple stopper portions 14*st* that are formed on the inner perimeter of the intermediate plate 14 and that are spaced (equally spaced) from each other in the circumferential direction; and a spring supporting portion 15*st* extending in the circumferential direction from the outer perimeter of each of the spring abutment portions 15*c* of the driven plate 15B. That is, when each of the stopper portions 14*st* of the intermediate plate 14 comes into abutment with the spring supporting portion 15*st* of a corresponding one of the spring abutment portions 15*c*, relative rotation between the intermediate plate 14 and the driven plate 15B is restricted.

In contrast, the second stopper ST2 restricts relative rotation between the drive member 11B and the intermediate plate 14, when the input torque to the drive member 11B or the torque applied from the axle shaft to the driven plate 15B reaches a torque T2 (a second threshold value) corresponding to a maximum torsional angle θmax of the damper device 10B. In the damper device 10B, the second stopper ST2 is structured with the following: the multiple rivets 90 that couple together the first and second input plates 12B and 13B of the drive member 11B; and the protrusions 14*e* of the intermediate plate 14. That is, when at least any of the multiple rivets 90 comes into abutment with the circumferential end of the protrusion 14*e* of the intermediate plate 14, relative rotation between the drive member 11B and the intermediate plate 14 is restricted, and thus, deflection of the input springs SP11, the output springs SP12, and the second springs SP2 is restricted.

In the starting apparatus 1B structured as described above, with the lockup clutch 8 releasing the lockup, as can be seen from FIG. 7, torque (power) transmitted from the engine EG to the front cover 3 is transmitted to the input shaft IS of the transmission TM through a path including the pump impeller 4, the turbine runner 5, and the damper hub 7. In contrast, when the lockup is executed by the lockup clutch 8 of the starting apparatus 1B, torque transmitted from the engine EG to the drive member 11B via the front cover 3 and the lockup clutch 8 is transmitted to the driven plate 15B and the damper hub 7 via the rotary inertia mass damper 20B that is disposed parallel with the multiple input springs SP11 and a torque transmission path including the multiple input springs SP11, the intermediate plate 14, and the multiple output springs SP12 as long as the following conditions are both met: the input torque or the other is less than the torque T1; and the torsion angle of the drive member 11B with respect to the driven plate 15B is less than the predetermined angle θref.

In this case, as the drive member 11B rotates (twists) relative to the intermediate plate 14 and the driven plate 15B, at least either the input springs SP11 or the output springs SP12 deflect while the ring gear 25 as a mass body rotates (swings) about the axis in accordance with the relative rotation between the drive member 11B and the intermediate plate 14. When the drive member 11B rotates (swings) relative to the intermediate plate 14 in this way, the rotation speed of the drive member 11B that is an input element of the planetary gear 21B and serves as a carrier, i.e., the rotation speed of the first and second input plates 12B and 13B becomes higher than the rotation speed of the intermediate plate 14 that serves as a sun gear. Consequently, at this time, the ring gear 25 is accelerated by the action of the planetary gear 21B and rotates at a higher speed than the intermediate plate 14. Thus, inertia torque is applied via the pinion gears 23 to the intermediate plate 14 from the ring gear 25, which is a mass body of the rotary inertia mass damper 20B, so that vibration of the driven plate 15B can be damped.

That is, the damper device 10B makes it possible that one of the vibration transmitted from the output springs SP12 to the driven plate 15B and the vibration transmitted from the rotary inertia mass damper 20B to the driven plate 15B via the intermediate plate 14 and the output springs SP12 at least partially cancels the other to effectively damp the vibration of the driven plate 15B. Further, in the damper device 10B, the output springs SP12 are interposed between the rotary inertia mass damper 20B and the transmission TM coupled to the driven plate 15B, thus reducing the influence of the moment of inertia of the entire rotary inertia mass damper 20B on a natural frequency that is determined by the moment of inertia of shaft members (the input shaft IS, an output shaft, an intermediate shaft, etc.) of the transmission TM. It is noted that between the drive member 11B and the intermediate plate 14, the rotary inertia mass damper 20B transmits mainly the inertia torque and does not transmit the average torque.

Further, when the input torque or the other becomes greater than or equal to the torque T1, and the torsion angle of the drive member 11B with respect to the driven plate 15B becomes greater than or equal to the predetermined angle θref, the first stopper ST1 restricts relative rotation between the intermediate plate 14 and the driven plate 15B and deflection of the output springs SP12. Further, when the input torque or the other becomes greater than or equal to the torque T1, one end of each of the second springs SP2 comes into abutment with one of the outer spring contact portions 12co and the like provided on both sides of the corresponding outer spring holding window 12wo and the like of the first and second input plates 12B and 13B.

Thus, until the second stopper ST2 restricts relative rotation between the drive member 11B and the driven plate 15B because the input torque or the other reaches the torque T2, the torque transmitted to the drive member 11B is transmitted to the intermediate plate 14 via the multiple input springs SP11, the multiple second springs SP2 acting in parallel with the multiple input springs SP11, and the rotary inertia mass damper 20B, and is transmitted to the driven plate 15B and the damper hub 7 via the first stopper ST1 and the output springs SP12 deflection of which is being restricted. That is, in the damper device 10B, when the torsion angle between the drive member 11B and the driven plate 15B increases, the multiple second springs SP2 act in parallel with the multiple input springs SP11. This increases the stiffness of the damper device 10B in accordance with an increase in torsion angle between the drive member 11B and the driven plate 15B, thus making it possible to transmit large torque or to receive impact torque or the like using the input springs SP11 and the second springs SP2 acting in parallel.

The rotary inertia mass damper 20B of the damper device 10B has a similar configuration to that of the damper device 10 described above, with the exception that the intermediate plate 14 functions as a sun gear of the planetary gear 21B in place of the driven plate 15B. Thus, also with the damper device 10B, it is possible to obtain functions and effects similar to functions and effects related to the configuration of the ring gear 25 of the damper device 10 described above.

Further, in the damper device 10B, the intermediate plate 14 as a sun gear, and the annulus gear 250 and the weight body 251 of the ring gear 25 are parts formed by press working. This makes it possible to further reduce the cost of manufacturing the intermediate plate 14 and the ring gear 25, and thus to effectively control an increase in the cost of the damper device 10B including the rotary inertia mass damper 20B. Further, in the damper device 10B, the intermediate plate 14, the driven plate 15B, and the annulus gear 250 can be formed by so-called nesting. Thus, a base material can be efficiently used to improve yield.

Figure 9:
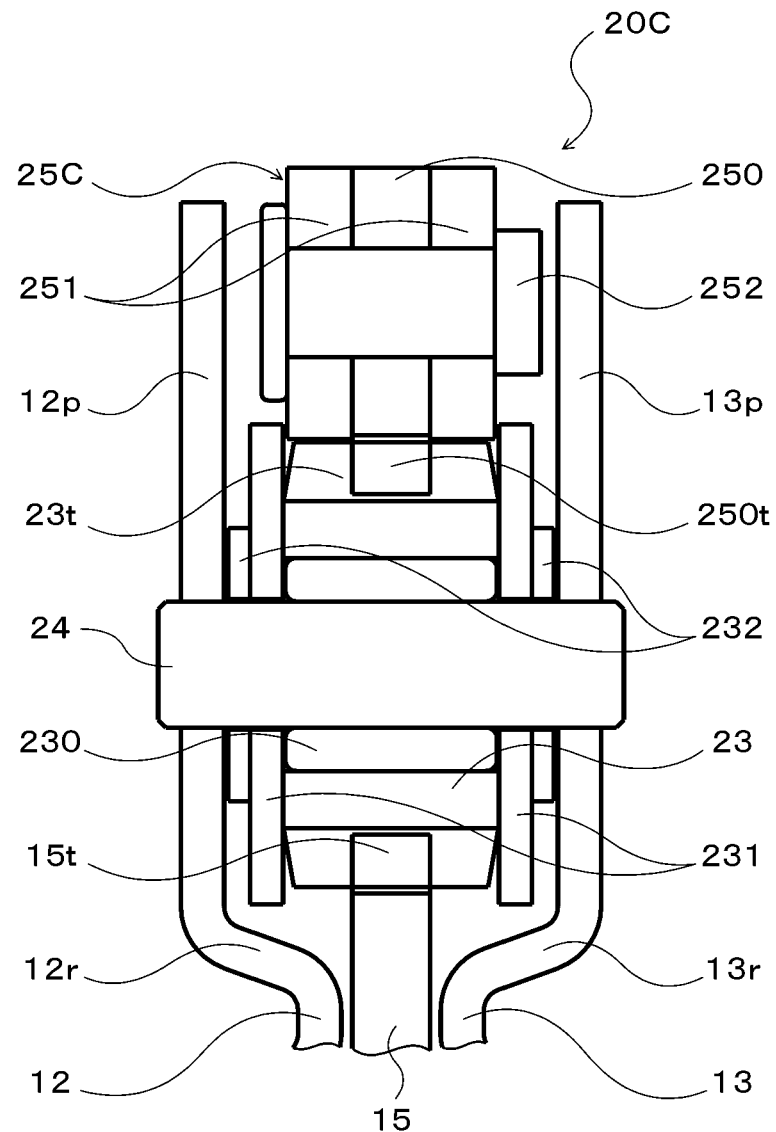
FIG. 9 is an enlarged view illustrating a main part of a rotary inertia mass damper according to a modified embodiment.

FIG. 9 is an enlarged view illustrating a main part of a rotary inertia mass damper 20C according to a modified embodiment. Among the components of the rotary inertia mass damper 20C, the same components as those of the rotary inertia mass damper 20 described above are denoted with the same reference signs and description thereof will be omitted.

A ring gear 25C of the rotary inertia mass damper 20C illustrated in FIG. 9 includes the following: the annular annulus gear 250 having the internal teeth 250t formed on its inner circumference; the two annular weight bodies 251 (first and second cone bodies); and the multiple rivets 252 for fastening the annulus gear 250 and the two weight bodies 251 together. The annulus gear 250 and the weight body 251 are each a part formed by press working from a steel sheet or the like. The two cone bodies 251 are located on both sides of the annulus gear 250 in the axial direction such that each of the cone bodies 251 is in contact with one side surface or the other side surface of the annulus gear 250. The axial length (thickness) of the weight body 251 is set such that the sum of the axial length of the two weight bodies and the axial length (thickness) of the annulus gear 250 is substantially equal to the axial length of the pinion gear 23. As illustrated, the inner circumference of each weight body 251 is supported in the radial direction by the tips of the external teeth 23t of the pinion gear 23. In addition, movement of the ring gear 25C in the axial direction is restricted by the large diameter washers 231 that are each abuttable with the side surface of the corresponding weight body 251.

In this damper device 20C, it is possible to obtain functions and effects related to the configuration of the ring gear 25 of the damper device 10 described above. In the rotary inertia mass damper 20C, as can be seen from FIG. 9, the center of the annulus gear 250 of the ring gear 25C in the axial direction (thickness direction) and the center of the driven plate (external teeth 150 serving as the sun gear in the axial direction (thickness direction) can be located on the same plane. Thus, the ring gear 25C can be suppressed from tilting and the ring gear 25C can rotate (pivot) smoothly, and therefore, a vibration damping effect can be further improved.

Figure 10:
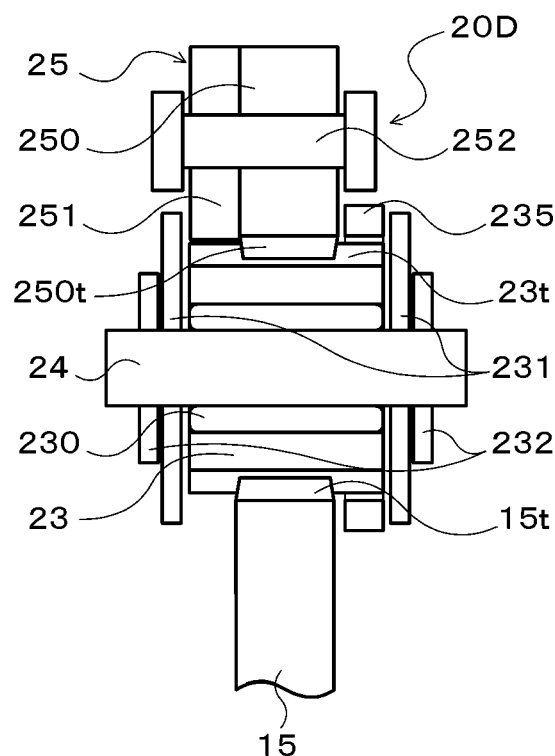
FIG. 10 is an enlarged view illustrating a main part of a rotary inertia mass damper according to another modified embodiment.

FIG. 10 is an enlarged view illustrating a main part of a rotary inertia mass damper 20D according to a modified embodiment. Among the components of the rotary inertia mass damper 20D, the same components as those of the rotary inertia mass damper 20 described above are denoted with the same reference signs and description thereof will be omitted.

In the rotary inertia mass damper 20D illustrated in FIG. 10, the axial length (thickness) of the weight body 251 is set to be smaller than that of the weight body 251 of the rotary inertia mass damper 20 described above. The inner circumferential surface of the weight body 251 is supported in the radial direction by the tips of the external teeth 23*t* of the pinion gear 23. Around the pinion gear 23 (external teeth 23*t*), a washer (second washer) 235 is located such that the washer 235 is abuttable with the side surface on the opposite side of the annulus gear 250 from the weight body 251 side. The axial length (thickness) of the washer 235 is set based on the difference between the axial length of the pinion gear 23 and the sum of the axial length (thickness) of the weight body 251 and the axial length (thickness) of the annulus gear 250.

Figure 11:
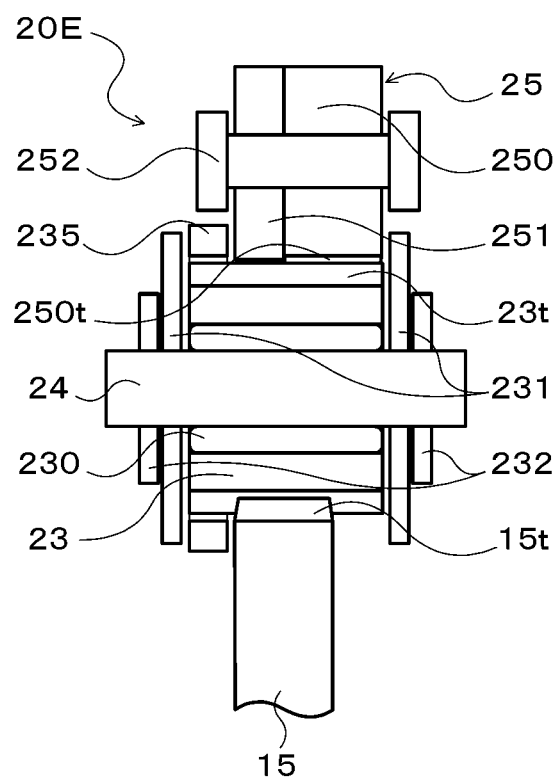
FIG. 11 is an enlarged view illustrating a main part of a rotary inertia mass damper according to yet another modified embodiment.

Thus, in the rotary inertia mass damper 20D, movement of the ring gear 25 in the axial direction is restricted by the pair of large diameter washers 231 and the washer 235. As a result, it is possible to satisfactorily reduce hysteresis of the rotary inertia mass damper 20D compared to the case where movement of the ring gear 25 in the axial direction is restricted by the first and second input plates of the drive member not shown that function as a carrier of the planetary gear, for example. Applying the washer 235 has particular utility when moment of inertia required for the ring gear 25 is relatively small and there is no need to increase the axial length (thickness) of the weight body 251. As in a rotary inertia mass damper 20E illustrated in FIG. 11, the washer 235 may be located around the pinion gear 23 (external teeth 23*t*) such that the washer 235 is abuttable with the side surface on the opposite side of weight body 251 from the annulus gear 250 side.

Figure 12:
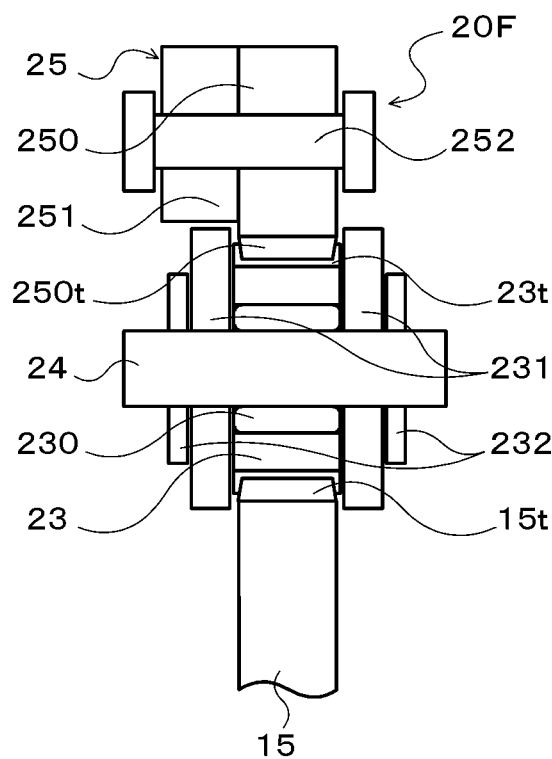
FIG. 12 is an enlarged view illustrating a main part of a rotary inertia mass damper according to still another modified embodiment.

FIG. 12 is an enlarged view illustrating a main part of a rotary inertia mass damper 20F according to yet another modified embodiment. Among the components of the rotary inertia mass damper 20F, the same components as those of the rotary inertia mass damper 20 described above are denoted with the same reference signs and description thereof will be omitted.

In the rotary inertia mass damper 20F illustrated in FIG. 12, the axial length (face width of the external teeth 150 of the driven plate 15 serving as the sun gear, the axial length (face width of the external teeth 23*t*) of the pinion gear 23, and the axial length (face width of the internal teeth 250*t*) of the annulus gear 250 are set to be substantially the same. The weight body 251 of the ring gear 25 has an inner radius that is slightly larger than a radius of the root circle of the internal teeth 250*t* of the annulus gear 250. The inner circumferential surface of the weight body 251 of the ring gear 25 is supported in the radial direction by one of the large diameter washers 231.

In the rotary inertia mass damper 20F, there is no need to provide on the pinion gear 23, a radial direction supporting portion dedicated to supporting the ring gear 25 in the radial direction and an external gear having a simple structure can be adopted as the pinion gear 23. It is thus possible to suppress an increase in cost that results from an increase in the number of assembly parts of the pinion gear 23 and from an increase in the number of steps of the manufacturing and assembly processes. Since the inner circumferential surface of the weight body 251 of the ring gear 25 is supported in the radial direction by the large diameter washers 231, the ring gear 25 can be accurately aligned with the axis of the first and second input plates serving as a carrier and the driven plate 15 serving as a sun gear so that the ring gear 25 can rotate (pivot) smoothly. Thus, a vibration damping effect of the rotary inertia mass damper 20F can be further improved. In the rotary inertia mass damper 20F, it is also possible to adjust the weight of the weight body 251 to appropriately set the moment of inertia of the ring gear 25 so as to further improve the vibration damping effect. In addition, the number of assembly parts of the ring gear 25 can be decreased by providing the weight body 251 on only one side surface of the annulus gear 250 of the ring gear 25.

In the rotary inertia mass damper 20F, movement of the ring gear 25 in the axial direction is restricted by the large diameter washer 231 that is abuttable with one side surface of the annulus gear 250 (internal teeth 250*t*) and by the large diameter washer 231 that is abuttable with the other side surface of the annulus gear 250 (internal teeth 250*t*). In this way, it is possible to satisfactorily reduce hysteresis of the rotary inertia mass damper 20F compared to the case where movement of the ring gear 25 in the axial direction is restricted by the first and second input plates of the drive member not shown that functions as a carrier of the planetary gear, for example.

Figure 13:
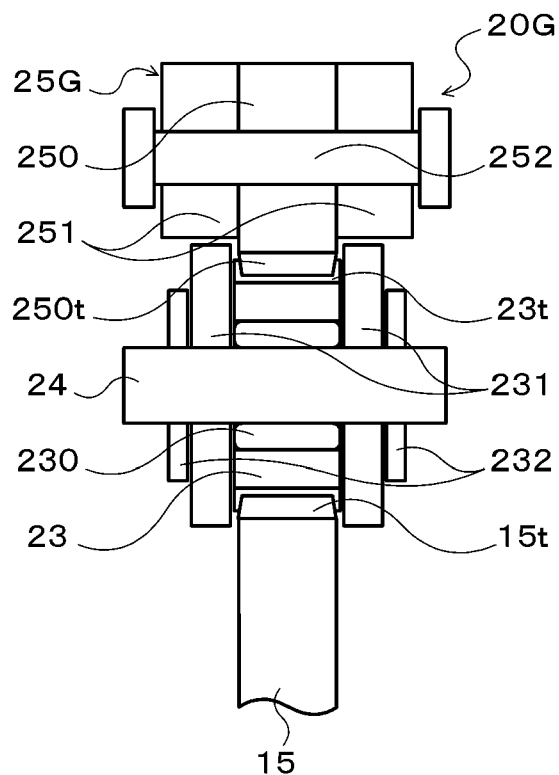
FIG. 13 is an enlarged view illustrating a main part of a rotary inertia mass damper according to yet another modified embodiment.

As with a ring gear 25G of a rotary inertia mass damper 20G illustrated in FIG. 13, the two annular weight bodies 251 (first and second cone bodies) may be located on both sides of the annulus gear 250 in the axial direction. The two cone bodies 251 are fixed to the annulus gear 250 via the multiple rivets 252 such that each of the cone bodies 251 is in contact with one or the other side surface of the annulus gear 250. In the rotary inertia mass damper 20G, the two weight bodies 251 each have an inner radius that is slightly larger than the radius of the root circle of the internal teeth 250*t* of the annulus gear 250. The inner circumferential surface of each weight body 251 is supported in the radial direction by the corresponding large diameter washer 231. Movement of the ring gear 25G in the axial direction is restricted by one large diameter washer 231 that is abuttable with one side surface of the annulus gear 250 (internal teeth 250*t*) and the other large diameter washer 231 that is abuttable with the other side surface of the annulus gear 250 (internal teeth 250*t*). In the rotary inertia mass damper 20G, moment of inertia of the ring gear 25G can be increased so that vibration damping effect can be further improved. In the rotary inertia mass damper 20G, the center of the annulus gear 250 of the ring gear 25G in the axial direction (thickness direction) and the center of the driven plate (external teeth 150 serving as a sun gear can be located on the same plane. Thus, the ring gear 25G can be suppressed from tilting and the ring gear 25G can rotate (pivot) smoothly, and therefore, a vibration damping effect can be further improved.

As described above, a damper device according to the present disclosure is a damper device (10, 10B) including the following: a plurality of rotating elements including an input element (11, 11B) to which torque from an engine (EG) is transmitted, and an output element (15, 15B); an elastic body (SP1, SP11) that transmits torque between the input element (11, 11B) and the output element (15, 15B); and a rotary inertia mass damper (20, 20B, 20C, 20D, 20E, 20F, 20G) having a mass body (25, 25C, 25G) that rotates in accordance with relative rotation between a first rotating element (15, 14) that is any of the plurality of rotating elements and a second rotating element (11, 11B, 12, 12B, 13, 13B) that is different from the first rotating element. The rotary inertia mass damper (20, 20B, 20C, 20D, 20E, 20F, 20G) has a planetary gear (21, 21B) that includes the following: a sun gear (15, 15*t*, 14, 14*t*) that rotates as a unit with the first rotating element; a carrier (11, 11B, 12, 12B, 13, 13B) that rotatably supports a plurality of pinion gears (23) and that rotates as a unit with the second rotating element; and a ring gear (25, 25C, 25G) that meshes with the plurality of pinion gears (23) and that serves as the mass body. On both sides each of the pinion gears (23) in the axial direction, at least one pair of washers (231) is located. The ring gear (25, 25C, 25G) includes the following: an annulus gear (250) having a plurality of internal teeth (250*t*) that mesh with the plurality of pinion gears (23); and a weight body (251) that is fixed to the annulus gear (250) such that the weight body (251) is in contact with a side surface of the annulus gear (250). An inner circumferential surface of the weight body (251) is supported in a radial direction by a tip of the pinion gear (23) or an outer circumferential surface of the washer (231).

In the damper device of the present disclosure, the ring gear of the rotary inertia mass damper includes the following: the annulus gear having the internal teeth that mesh with the pinion gears; and the weight body that is fixed to the annulus gear such that the weight body is in contact with the side surface of the annulus gear. The inner circumferential surface of the weight body is supported in the radial direction by the tip of the pinion gear the outer circumferential surface of the washer located on a side of the pinion gear. In this way, an external gear having a simple structure can be adopted as the pinion gear and it is possible to suppress an increase in cost that results from an increase in the number of assembly parts of the pinion gear and from an increase in the number of steps of the manufacturing and assembly process. Since the inner circumferential surface of the weight body of the ring gear is supported in the radial direction by the tip of the pinion gear or the outer circumferential surface of the washer, the ring gear can be accurately aligned with the axis of the carrier and the sun gear so that the ring gear can rotate (pivot) smoothly. Thus, a vibration damping effect of the rotary inertia mass damper can be further improved. In the damper device, it is also possible to adjust the weight of the weight body to appropriately set the moment of inertia of the ring gear so as to further improve the vibration damping effect of the rotary inertia mass damper. As a result, it is possible to further improve the vibration damping effect of the rotary inertia mass damper while suppressing an increase in the number of assembly parts of the damper device and an increase in cost.

The ring gear (25) may include a weight body (250) that is fixed to the annulus gear (25) such that the weight body (250) is in contact with one side surface of the annulus gear (250). Face widths of the annulus gear (250) of the ring gear (25) and the sun gear (15, 15*t*, 14, 14*t*) may be less than a face width of the pinion gear (23). The annulus gear (250) may be located offset from the sun gear (15, 15*t*, 14, 14*t*) in the axial direction. Consequently, it is possible to increase the length (thickness) of the weight body in the axial direction of the damper device to further increase the moment of inertia of the ring gear and also sufficiently ensure an area of the weight body that is supported by the tip of the pinion gear or the washer to improve the alignment accuracy of the ring gear. In addition, the number of assembly parts of the ring gear can be decreased by providing the weight body on only one side surface of the annulus gear of the ring gear. Further, when the face widths of the annulus gear of the ring gear and the external teeth are both made less than the face width of the pinion gear, the sun gear and the annulus gear of the ring gear can be formed by so-called nesting. Thus, a base material can be efficiently used to improve yield.

In addition, the inner circumferential surface of the weight body (251) may be supported in the radial direction by the tip of the pinion gear (23) and movement of the ring gear (25) in the axial direction may be restricted by the washer (231) that is abuttable with a side surface of the annulus gear (250) and the washer (231) that is abuttable with a side surface of the weight body (251). In this way, it is possible to satisfactorily reduce hysteresis of the rotary inertia mass damper compared to the case where movement of the ring gear in the axial direction is restricted by a member that functions as a carrier of the planetary gear.

The inner circumferential surface of the weight body (251) may be supported in the radial direction by the washer (231) and movement of the ring gear (25) in the axial direction may be restricted by the washer (231) that is abuttable with one side surface of the annulus gear (250) and the washer (231) that is abuttable with the other side surface of the annulus gear (250). Even if the above configuration is adopted, it is possible to satisfactorily reduce hysteresis of the rotary inertia mass damper compared to the case where movement of the ring gear in the axial direction is restricted by a member that functions as a carrier of the planetary gear.

In addition, around the pinion gear (23), a second washer (235) may be located so as to be abuttable with a side surface on an opposite side of the annulus gear (250) from the weight body (251) side or a side surface on an opposite side of the weight body (251) from the annulus gear (250) side. The inner circumferential surface of the weight body (251) may be supported in the radial direction by the tip of the pinion gear (23). Movement of the ring gear (25) in the axial direction may be restricted by the at least one pair of the washers (231) and the second washer (235). Even if the above configuration is adopted, it is possible to satisfactorily reduce hysteresis of the rotary inertia mass damper compared to the case where movement of the ring gear in the axial direction is restricted by a member that functions as a carrier of the planetary gear. The above configuration has particular utility when moment of inertia required for the ring gear is relatively small and there is no need to increase the axial length (thickness) of the weight body.

The cone body (25C, 25G) may include the following: a first weight body (251) that is fixed to the annulus gear (250) such that the first weight body (251) is in contact with one side surface of the annulus gear (250); and a second weight body (251) that is fixed to the annulus gear (250) such that the second weight body (251) is in contact with the other side surface of the annulus gear (250).

In addition, an inner circumferential surface of the first cone body (251) may be supported in the radial direction by one of the one pair of washers (231) and an inner circumferential surface of the second cone body (251) may be supported in the radial direction by the other one of the one pair of washers (231). Movement of the ring gear (25G) in the axial direction may be restricted by the one of the one pair of washers (231) that is abuttable with the one side surface of the annulus gear (250) and the other one of the one pair of washers (231) that is abuttable with the other side surface of the annulus gear (250).

Inner circumferential surfaces of the first and second cone bodies (251) may be supported in the radial direction by the tip of the pinion gear (23). Movement of the ring gear (25C) in the axial direction may be restricted by one of the one pair of washers (231) that is abuttable with the one side surface of the annulus gear (250) and the other one of the one pair of washers (231) that is abuttable with the other side surface of the annulus gear (250).

The first rotating element may be the output element (15) and the second rotating element may be the input element (11). In this way, it is possible further reduce the cost of the damper device by omitting an intermediate element from the damper device.

Further, the rotating elements may include an intermediate element (14), the elastic body may include an input elastic body (SP11) that transmits torque between the input element (11B) and the intermediate element (14), and an output elastic body (SP12) that transmits torque between the intermediate element (14) and the output element (15B), the first rotating element may be the intermediate element (14), and the second rotating element may be the input element (11B). In this damper device, the output elastic body is interposed between the rotary inertia mass damper and an element coupled to the output element, thus reducing the influence of the moment of inertia of the entire rotary inertia mass damper on a natural frequency that is determined by the moment of inertia of the element coupled to the output element.

Further, the output element (15, 15B) may be operatively (directly or indirectly) coupled to an input shaft (IS) of a transmission (TM).

The various aspects according to the present disclosure is not limited at all to the embodiments described above, and various modifications are possible within the scope of the present disclosure. In addition, the above embodiments of the of the disclosure are merely one specific example described in SUMMARY OF THE DISCLOSURE section and are not intended to limit the elements of the various aspects described in SUMMARY OF THE DISCLOSURE section.

INDUSTRIAL APPLICABILITY

The aspects according to the present disclosure is applicable, for example, in the field of manufacturing of damper devices.

The invention claimed is:

1. A damper device comprising:
a plurality of rotating elements including an input element to which torque from an engine is transmitted, and an output element;
an elastic body that transmits torque between the input element and the output element; and
a rotary inertia mass damper having a mass body that rotates in accordance with relative rotation between a first rotating element that is any of the plurality of rotating elements and a second rotating element that is different from the first rotating element, wherein
the rotary inertia mass damper has a planetary gear including a sun gear that rotates as a unit with the first rotating element, a carrier that rotatably supports a plurality of pinion gears and that rotates as a unit with the second rotating element, and a ring gear that meshes with the plurality of pinion gears and that serves as the mass body, and
at least one pair of washers is located on both sides of each the pinion gears in an axial direction,
the ring gear includes an annulus gear having a plurality of internal teeth that mesh with the plurality of pinion gears and a weight body that is fixed to the annulus gear such that the weight body is in contact with a side surface of the annulus gear, and
an inner circumferential surface of the weight body is supported in a radial direction by a tip of the pinion gear or an outer circumferential surface of the washer.

2. The damper device according to claim 1, wherein
the ring gear includes a weight body that is fixed to the annulus gear such that the weight body is in contact with one side surface of the annulus gear,
face widths of the annulus gear of the ring gear and the sun gear is less than a face width of the pinion gear, and
the annulus gear is located offset from the sun gear in the axial direction.

3. The damper device according to claim 1, wherein
the inner circumferential surface of the weight body is supported in the radial direction by the tip of the pinion gear, and
movement of the ring gear in the axial direction is restricted by the washer that is abuttable with a side surface of the annulus gear and the washer that is abuttable with a side surface of the weight body.

4. The damper device according to claim 1, wherein
the inner circumferential surface of the weight body is supported in the radial direction by the washer, and
movement of the ring gear in the axial direction is restricted by the washer that is abuttable with one side surface of the annulus gear and the washer that is abuttable with the other side surface of the annulus gear.

5. The damper device according to claim 1, wherein
around the pinion gear, a second washer is located so as to be abuttable with a side surface on an opposite side of the annulus gear from the weight body side or a side surface on an opposite side of the weight body from the annulus gear side,
the inner circumferential surface of the weight body is supported in the radial direction by the tip of the pinion gear, and
movement of the ring gear in the axial direction is restricted by the at least one pair of washers and the second washer.

6. The damper device according to claim 1, wherein
the cone body includes a first weight body that is fixed to the annulus gear such that the first weight body is in contact with one side surface of the annulus gear and a second weight body that is fixed to the annulus gear such that the second weight body is in contact with the other side surface of the annulus gear.

7. The damper device according to claim 6, wherein
an inner circumferential surface of the first cone body is supported in the radial direction by one of the one pair of washers,
an inner circumferential surface of the second cone body is supported in the radial direction by the other one of the one pair of washers, and
movement of the ring gear in the axial direction is restricted by the one of the one pair of washers that is abuttable with the one side surface of the annulus gear and the other one of the one pair of washers that is abuttable with the other side surface of the annulus gear.

8. The damper device according to claim 6, wherein
inner circumferential surfaces of the first and second cone bodies are supported in the radial direction by the tip of the pinion gear, and
movement of the ring gear in the axial direction is restricted by one of the one pair of washers that is abuttable with the one side surface of the annulus gear and the other one of the one pair of washers that is abuttable with the other side surface of the annulus gear.

9. The damper device according to claim 1, wherein the first rotating element is the output element, and the second rotating element is the input element.

10. The damper device according to claim 1, wherein
the rotating elements include an intermediate element,
the elastic body includes an input elastic body that transmits torque between the input element and the intermediate element, and an output elastic body that transmits torque between the intermediate element and the output element, and
the first rotating element is the intermediate element, and the second rotating element is the input element.

11. The damper device according to claim 1, wherein the output element is operatively coupled to an input shaft of a transmission.

12. The damper device according to claim 2, wherein
the inner circumferential surface of the weight body is supported in the radial direction by the tip of the pinion gear, and
movement of the ring gear in the axial direction is restricted by the washer that is abuttable with a side surface of the annulus gear and the washer that is abuttable with a side surface of the weight body.

13. The damper device according to claim 2, wherein
the inner circumferential surface of the weight body is supported in the radial direction by the washer, and
movement of the ring gear in the axial direction is restricted by the washer that is abuttable with one side surface of the annulus gear and the washer that is abuttable with the other side surface of the annulus gear.

14. The damper device according to claim 2, wherein
around the pinion gear, a second washer is located so as to be abuttable with a side surface on an opposite side of the annulus gear from the weight body side or a side surface on an opposite side of the weight body from the annulus gear side,
the inner circumferential surface of the weight body is supported in the radial direction by the tip of the pinion gear, and
movement of the ring gear in the axial direction is restricted by the at least one pair of washers and the second washer.

* * * * *